US012737444B2

(12) United States Patent
Walters et al.

(10) Patent No.: US 12,737,444 B2
(45) **Date of Patent: *Sep. 15, 2026**

(54) INTERACTION-BASED AUTHENTICATION AND USER INTERFACE ADJUSTMENT

(71) Applicant: Capital One Services, LLC, McLean, VA (US)

(72) Inventors: Austin Walters, Savoy, IL (US); Brian Barr, Schenectady, NY (US); Anh Truong, Champaign, IL (US); Jeremy Goodsitt, Champaign, IL (US); Grant Eden, San Francisco, CA (US); Samuel Sharpe, Cambridge, MA (US); Galen Rafferty, Mahomet, IL (US); Christopher Wallace, Frisco, TX (US)

(73) Assignee: Capital One Services, LLC, McLean, VA (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/908,041

(22) Filed: Oct. 7, 2024

(65) Prior Publication Data

US 2025/0028810 A1 Jan. 23, 2025

Related U.S. Application Data

(63) Continuation of application No. 17/818,150, filed on Aug. 8, 2022, now Pat. No. 12,118,072.

(51) Int. Cl.

| | |
|---|---|
| ***G06F 21/36*** | (2013.01) |
| ***G06F 9/451*** | (2018.01) |
| ***G06F 21/31*** | (2013.01) |
| ***G06F 21/32*** | (2013.01) |

(52) U.S. Cl.
CPC .............. *G06F 21/36* (2013.01); *G06F 9/451* (2018.02); *G06F 21/32* (2013.01)

(58) Field of Classification Search
CPC .......... G06F 21/36; G06F 9/451; G06F 21/32; G06F 21/316
See application file for complete search history.

(56) References Cited

U.S. PATENT DOCUMENTS

| | | | |
|---|---|---|---|
| 9,400,879 | B2 | 7/2016 | Tredoux et al. |
| 10,025,460 | B1 | 7/2018 | Almand et al. |
| 2008/0228685 | A1 | 9/2008 | Shivaji-Rao et al. |

(Continued)

*Primary Examiner* — Darren B Schwartz
(74) *Attorney, Agent, or Firm* — Harrity & Harrity, LLP

(57) ABSTRACT

In some implementations, a server may receive, from a user device, one or more credentials associated with a user. Accordingly, the server may transmit, to the user device, instructions for generating a user interface including a plurality of visual components based on authenticating the user with the one or more credentials. The server may detect, during a first interval, a lack of interaction with the user interface. Accordingly, the server may remove one of the plurality of visual components from the user interface based on the lack of interaction. Additionally, the server may detect, during a second interval, one or more interactions with the user interface and may update a similarity score associated with the user based on properties associated with the one or more interactions. Accordingly, the server may restore the visual component to the user interface based on the updated similarity score satisfying a similarity threshold.

19 Claims, 22 Drawing Sheets

(56) References Cited

U.S. PATENT DOCUMENTS

| | | | | |
|---|---|---|---|---|
| 2009/0006856 | A1 | 1/2009 | Abraham et al. | |
| 2009/0260010 | A1 | 10/2009 | Burkhart et al. | |
| 2015/0347209 | A1 | 12/2015 | Lyubinin et al. | |
| 2018/0095941 | A1* | 4/2018 | Ciabarra, Jr. ......... | G06F 40/143 |
| 2018/0288168 | A1 | 10/2018 | Sharifi et al. | |
| 2022/0029986 | A1* | 1/2022 | Neumann .............. | G16H 80/00 |
| 2024/0045941 | A1 | 2/2024 | Walters et al. | |

* cited by examiner

300

710 Transmit, to a user device, instructions for generating a user interface including a first set of visual components 720 Detect, during a first interval, one or more first interactions with the user interface 730 Calculate a similarity score associated with a user based on first properties associated with the one or more first interactions and a fingerprint associated with the user 740 Add a second set of visual components to the user interface based on the similarity score satisfying a first similarity threshold 750 Detect, during a second interval, one or more second interactions with the user interface 760 Update the similarity score associated with the user based on second properties associated with the one or more second interactions and the fingerprint associated with the user 770 Remove the second set of visual components from the user interface based on the updated similarity score failing to satisfy the first similarity threshold

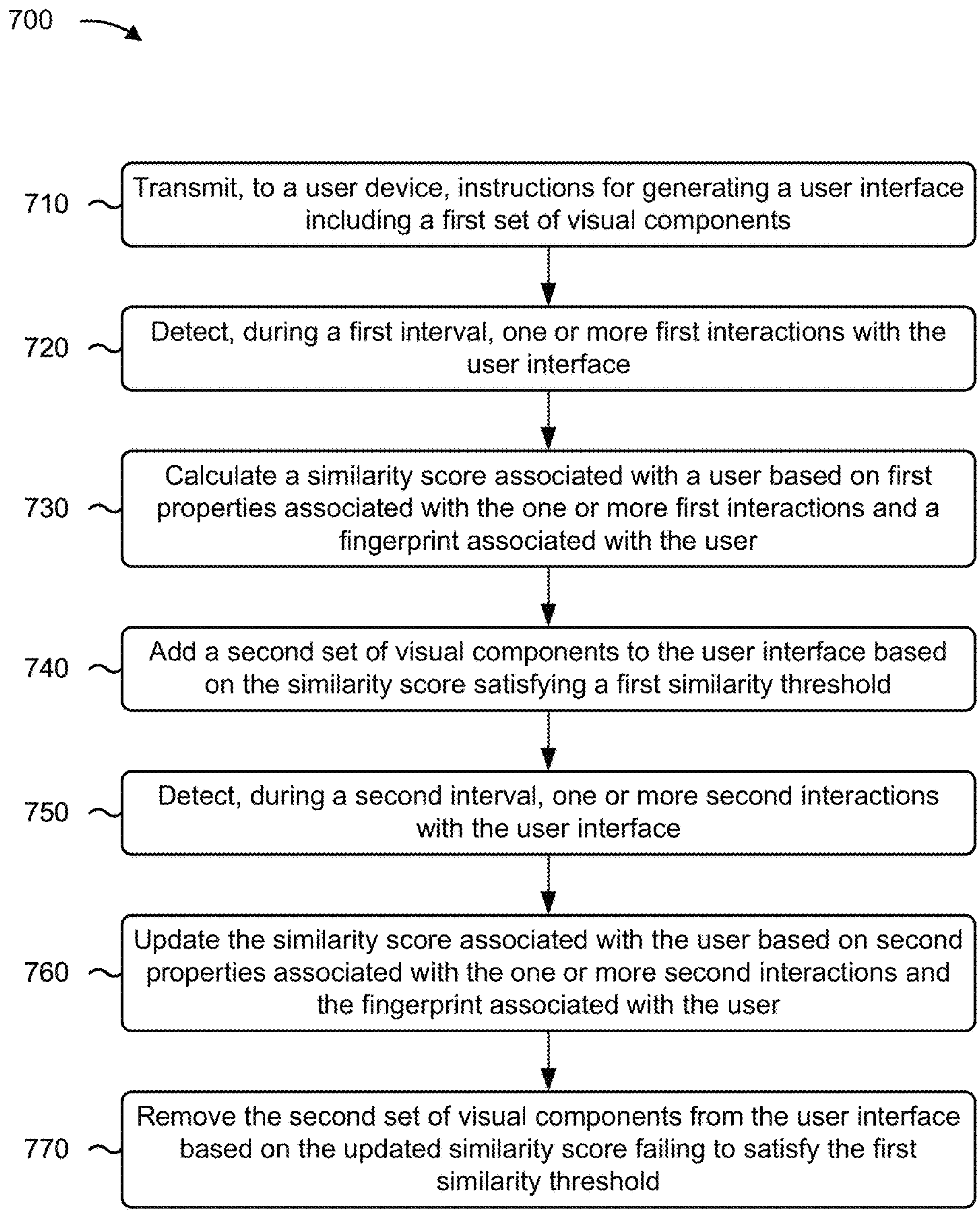

FIG. 7

INTERACTION-BASED AUTHENTICATION AND USER INTERFACE ADJUSTMENT

RELATED APPLICATION

This application is a continuation of U.S. patent application Ser. No. 17/818,150, filed Aug. 8, 2022 (now U.S. Pat. No. 12,118,072), which is incorporated herein by reference in its entirety.

BACKGROUND

User authentication is usually performed based on credentials. For example, a user may provide a username and password, a personal identification number (PIN), or a biometric identification in order to gain access to a secure portion of a website. A host of the website may also apply a timer such that the user must again provide credentials to access the secure portion of the website when the user has not interacted with the website between a start and an expiry of the timer.

SUMMARY

Some implementations described herein relate to a system for interaction-based authentication and adjustment of a user interface accordingly. The system may include one or more memories and one or more processors communicatively coupled to the one or more memories. The one or more processors may be configured to receive, from a user device, one or more credentials associated with a user of the user device. The one or more processors may be configured to transmit, to the user device, instructions for generating a user interface including a plurality of visual components based on authenticating the user with the one or more credentials. The one or more processors may be configured to detect, during a first interval, a lack of interaction with the user interface. The one or more processors may be configured to remove at least one visual component, of the plurality of visual components, from the user interface based on the lack of interaction. The one or more processors may be configured to detect, during a second interval, one or more interactions with the user interface. The one or more processors may be configured to update a similarity score associated with the user based on properties associated with the one or more interactions and a fingerprint associated with the user. The one or more processors may be configured to restore the at least one visual component to the user interface based on the updated similarity score satisfying a similarity threshold.

Some implementations described herein relate to a method of interaction-based authentication and adjustment of a user interface accordingly. The method may include transmitting, to a user device, instructions for generating a user interface including a first set of visual components. The method may include detecting, during a first interval, one or more first interactions with the user interface. The method may include calculating a similarity score associated with a user based on first properties associated with the one or more first interactions and a fingerprint associated with the user. The method may include adding a second set of visual components to the user interface based on the similarity score satisfying a first similarity threshold. The method may include detecting, during a second interval, one or more second interactions with the user interface. The method may include updating the similarity score associated with the user based on second properties associated with the one or more second interactions and the fingerprint associated with the user. The method may include adding a third set of visual components to the user interface based on the updated similarity score satisfying a second similarity threshold.

Some implementations described herein relate to a non-transitory computer-readable medium that stores a set of instructions for interaction-based authentication and adjustment of a user interface accordingly for a device. The set of instructions, when executed by one or more processors of the device, may cause the device to transmit, to a user device, instructions for generating a user interface including a first set of visual components. The set of instructions, when executed by one or more processors of the device, may cause the device to detect, during a first interval, one or more first interactions with the user interface. The set of instructions, when executed by one or more processors of the device, may cause the device to calculate a similarity score associated with a user based on first properties associated with the one or more first interactions and a fingerprint associated with the user. The set of instructions, when executed by one or more processors of the device, may cause the device to add a second set of visual components to the user interface based on the similarity score satisfying a first similarity threshold. The set of instructions, when executed by one or more processors of the device, may cause the device to detect, during a second interval, one or more second interactions with the user interface. The set of instructions, when executed by one or more processors of the device, may cause the device to update the similarity score associated with the user based on second properties associated with the one or more second interactions and the fingerprint associated with the user. The set of instructions, when executed by one or more processors of the device, may cause the device to remove the second set of visual components from the user interface based on the updated similarity score failing to satisfy the first similarity threshold.

BRIEF DESCRIPTION OF THE DRAWINGS

FIG. 7 is a flowchart of an example process relating to interaction-based authentication and user interface adjustment, in accordance with some embodiments of the present disclosure.

DETAILED DESCRIPTION

Figure 1A:
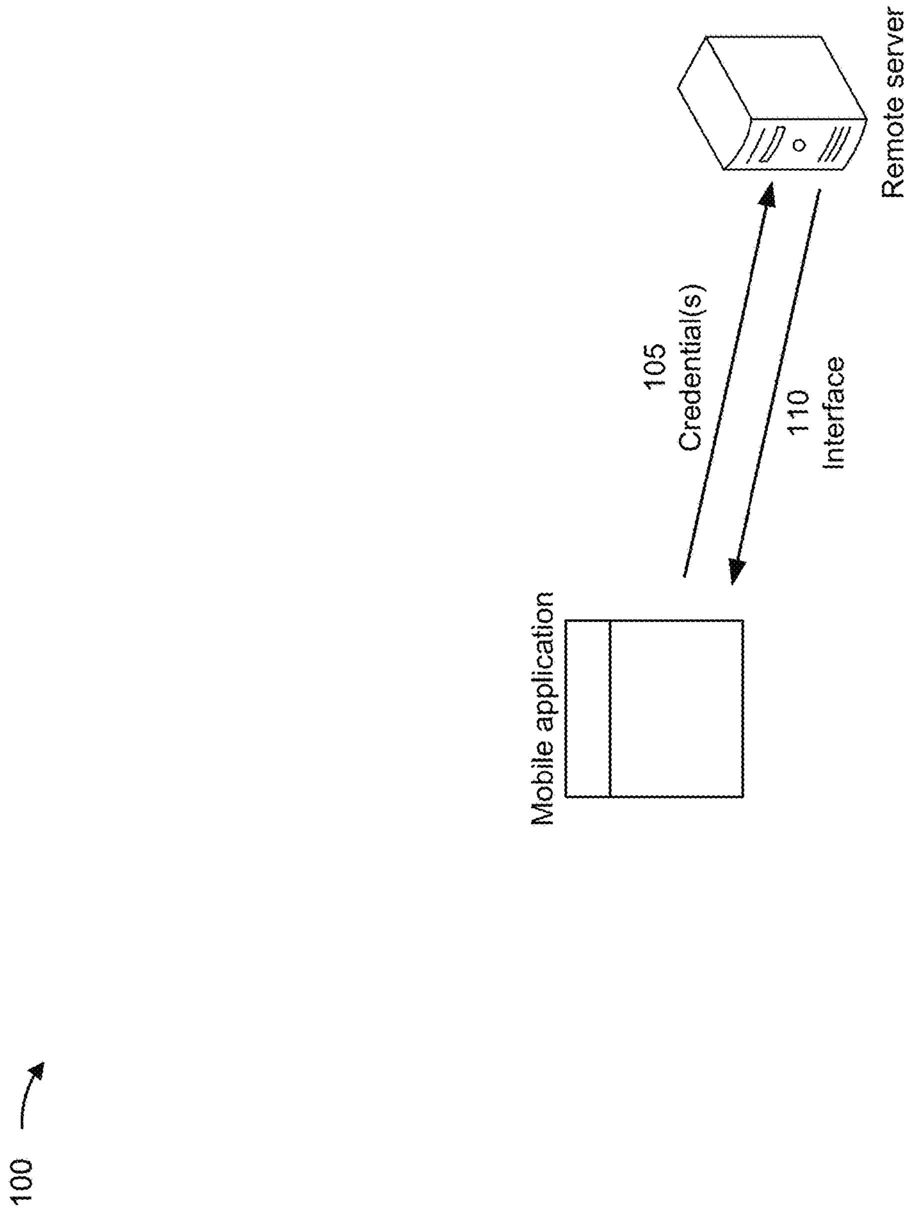
FIGS. 1A-1E are diagrams of an example implementation relating to interaction-based authentication and user interface adjustment, in accordance with some embodiments of the present disclosure.

The following detailed description of example implementations refers to the accompanying drawings. The same reference numbers in different drawings may identify the same or similar elements.

User authentication is usually performed based on credentials. For example, a user may provide a username and password, a personal identification number (PIN), or a biometric identification in order to gain access to a secure portion of a website or another remote resource. This process consumes power and processing resources at a user device and at a hosting device for the remote resource. Additionally, when the remote resource has numerous levels of sensitive content and/or functions, the user may apply different levels of authentication, such as two-factor authentication, which further costs power and processing resources at the user device and at the hosting device.

The hosting device may apply a timer such that the user must again provide credentials to access the secure portion of the remote resource when the user has not interacted with the remote resource between a start and an expiry of the timer. Accordingly, re-authentication consumes power and processing resources at the user device and at the hosting device for the remote resource.

Some implementations described herein provide for authenticating a user based on properties of the user's interactions with a remote resource. As a result, a hosting device can bypass some, or even all, credentials that would otherwise be provided by the user. Accordingly, the hosting device conserves power and processing resources at a user device of the user and at the hosting device itself. Additionally, or alternatively, some implementations described herein provide for re-authenticating a user (e.g., after a timer expiry) based on properties of the user's interactions with a remote resource. As a result, a hosting device can bypass the user providing credentials once again. Accordingly, the hosting device conserves power and processing resources at a user device of the user and at the hosting device itself.

FIGS. 1A-1E are diagrams of an example 100 associated with interaction-based authentication and user interface adjustment. As shown in FIGS. 1A-1E, example 100 includes a mobile application (e.g., supported by an operating system of a user device), a remote server, and one or more input devices (e.g., that are hardware components or peripherals of the user device). These devices are described in more detail in connection with FIGS. 5 and 6.

As shown by reference number 105, the mobile application may transmit, and the remote server may receive, credentials (e.g., one or more credentials) associated with a user of the user device. For example, the credentials may include a username and password, a PIN, a biometric identification, or another type of information that is unique (or at least quasi-unique) to the user. The mobile application may encrypt the credentials before transmitting (e.g., using a public key or a type of symmetric encryption), and the remote server may decrypt the credentials (e.g., using a private key). Accordingly, the remote server may authenticate the user based on the credentials.

In some implementations, the credentials may be transmitted with a request for content. For example, the mobile application may transmit a hypertext transfer protocol (HTTP) request, a file transfer protocol (FTP) request, or another type of request associated with an application layer of the user device, that includes the credentials. Alternatively, the credentials may be transmitted in response to a prompt from the remote server. For example, the mobile application may transmit an HTTP request, an FTP request, or type of request associated with the application layer, and the remote server may transmit a prompt for credentials. Accordingly, the mobile application may transmit the credentials based on the prompt (e.g., based on input from the user in response to displaying the prompt to the user). Alternatively, the mobile application may transmit the request for content without credentials.

Figure 2A:
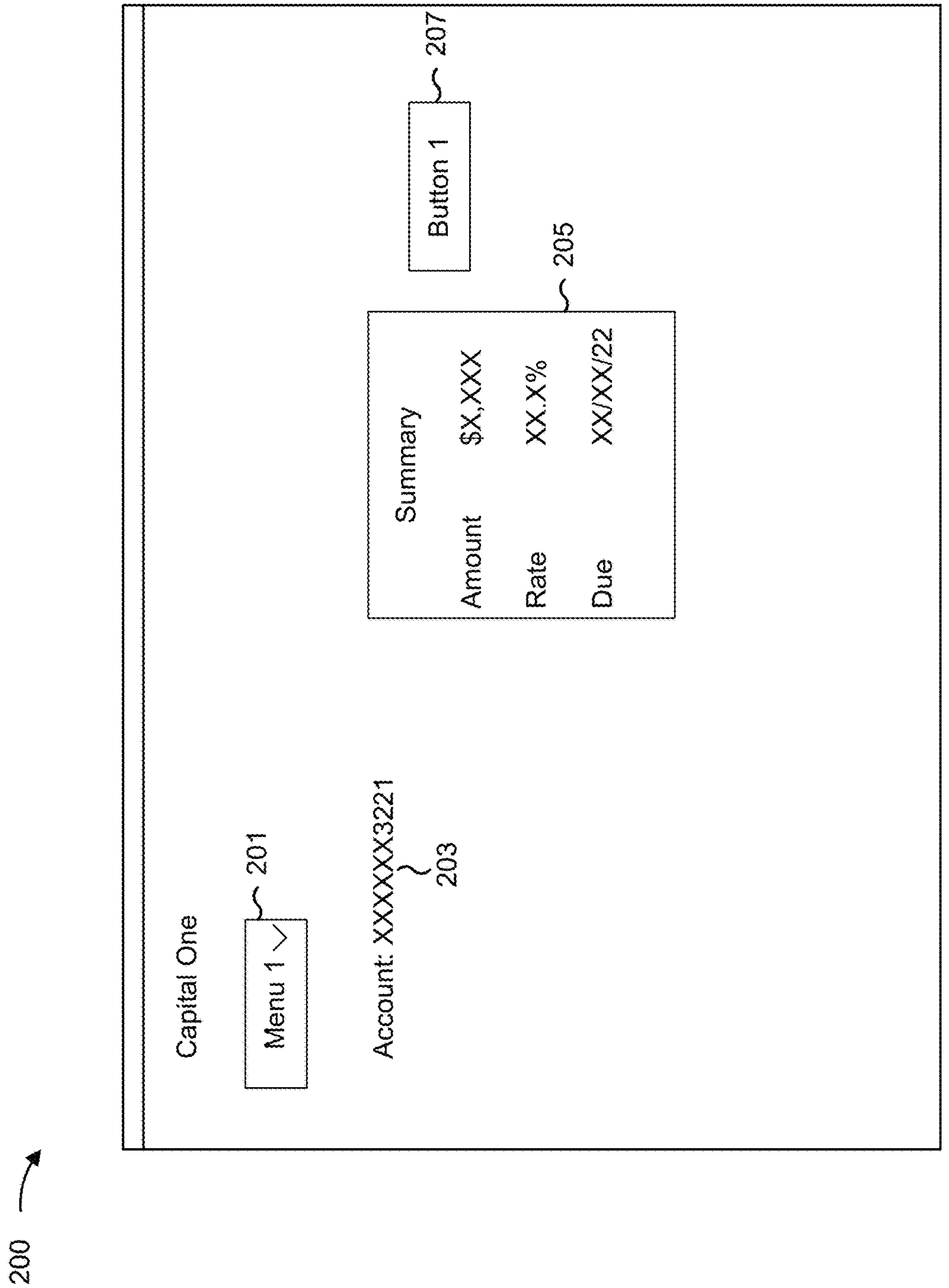
FIGS. 2A-2D are diagrams of example user interfaces, in accordance with some embodiments of the present disclosure.

As shown by reference number 110, the remote server may transmit, and the mobile application may receive, instructions for generating a user interface. The user interface may include a first set of visual components, such as text, a drop-down menu, a button, a text box, radio buttons, an image, or another type of graphical user interface (GUI) component. In some implementations, a visual component (e.g., at least one visual component) may be missing and/or obscured. For example, as shown in FIG. 2A, sensitive text information may be obscured. Additionally, or alternatively, a drop-down menu (or a portion thereof), a button, a text box, radio buttons, and/or an image may be missing.

The remote server may determine which visual components to obscure and/or remove based on a set of sensitivity rules. For example, each visual component may be associated with a corresponding sensitivity level, and the remote server may show visual components whose corresponding sensitivity levels satisfy a baseline security threshold. In some implementations, the remote server may use a machine learning model, such as a regression model, a decision tree, an artificial neural network, or another type of model to determine the corresponding sensitivity levels.

Figure 1B:
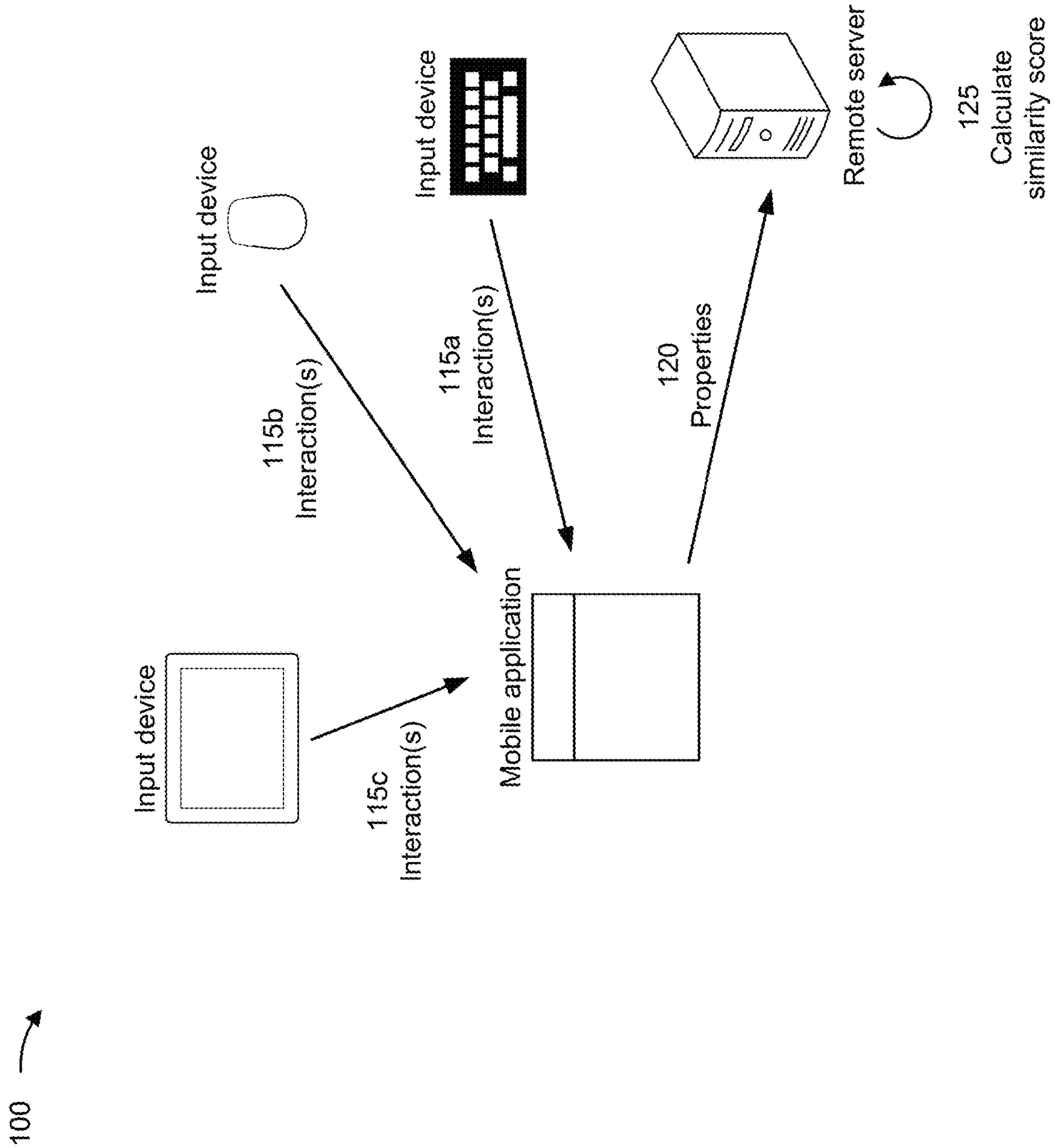

As shown in FIG. 1B and by reference numbers 115*a*, 115*b*, and 115*c*, the user may engage in first interactions (e.g., one or more first interactions) with the user interface. For example, the user may use input devices (e.g., one or more input devices) to interact with the user interface that is shown on a display of the user device. The input devices may include a touchscreen, a mouse, a keyboard, a microphone (e.g., for voice commands), or another type of device that generates electrical signals in response to stimulus from the user. Accordingly, the user may type, click or tap, and/or scroll.

Because the mobile application transmits indications of the first interactions to the remote server, the remote server detects the first interactions during a first interval. Additionally, as shown by reference number 120, the mobile application may transmit, and the remote server may receive, properties (e.g., one or more properties) associated with the first interactions. For example, the properties may include statistics regarding the first interactions, such as pixel zones associated with the first interactions, a quantity of clicks or taps within a time period, a typing speed, or a scrolling speed, among other examples. Additionally, or alternatively, the properties may include derived measurements, such as a typing cadence (e.g., a burst pattern associated with typing), a spelling record (e.g., a rate of misspells and/or general misspell patterns), a clicking or tapping pattern (e.g., a burst pattern associated with clicking or tapping), or a set of steps associated with a process (e.g., using Ctrl+C to copy and Ctrl+V to copy-and-paste, right-click menus to copy-and-paste, or a menu associated with the mobile application to copy-and-past; using a tap and dragging selectors to select a phrase or a double tap to select the phrase; or using a scroll wheel to scroll, arrow keys to scroll, or clicking a scroll bar to scroll), among other examples. Alternatively, the remote server may determine the properties based on receiving indications of the first interactions from the mobile application.

Accordingly, as shown by reference number 125, the remote server may calculate a similarity score associated with the user based on the properties associated with the first interactions and a fingerprint associated with the user. For example, the fingerprint may comprise a data structure that stores expected properties associated with the user. Accordingly, the remote server may determine a plurality of values associated with a plurality of dimensions in order to generate a vector based on the properties, each dimension being associated with a corresponding type of interaction (e.g., a dimension associated with typing that includes values for properties associated with typing, and so on).

Therefore, the remote server may compare the fingerprint to the vector in order to generate the similarity score. For example, the similarity score may comprise a (weighted) distance between the vector and the fingerprint. In another example, the similarity score may comprise a numerical indication of how many values in the vector satisfy an associated confidence threshold in the fingerprint. In some implementations, the remote server may use a machine learning model, such as a regression model, a decision tree, an artificial neural network, or another type of model to determine the similarity score.

Figure 1C:
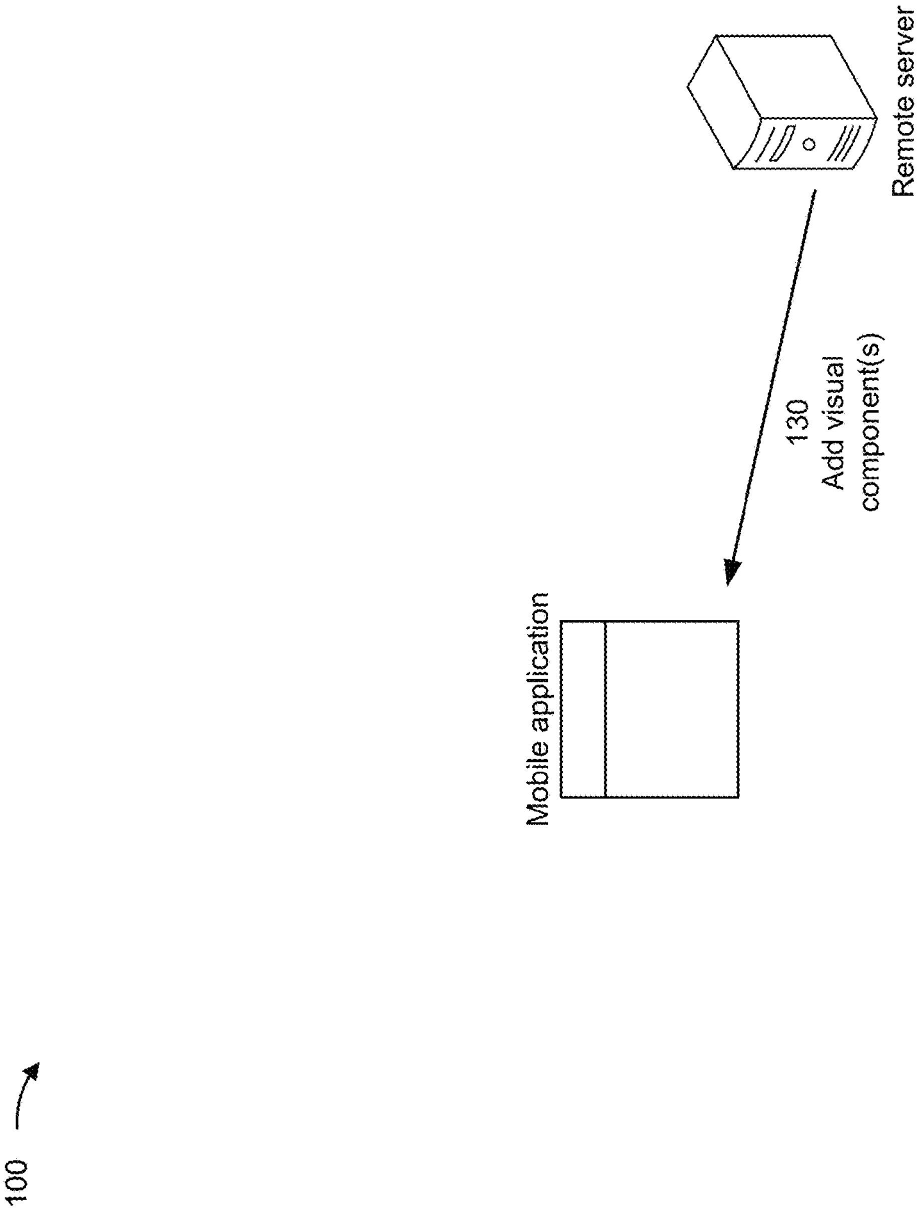
Figure 2B:
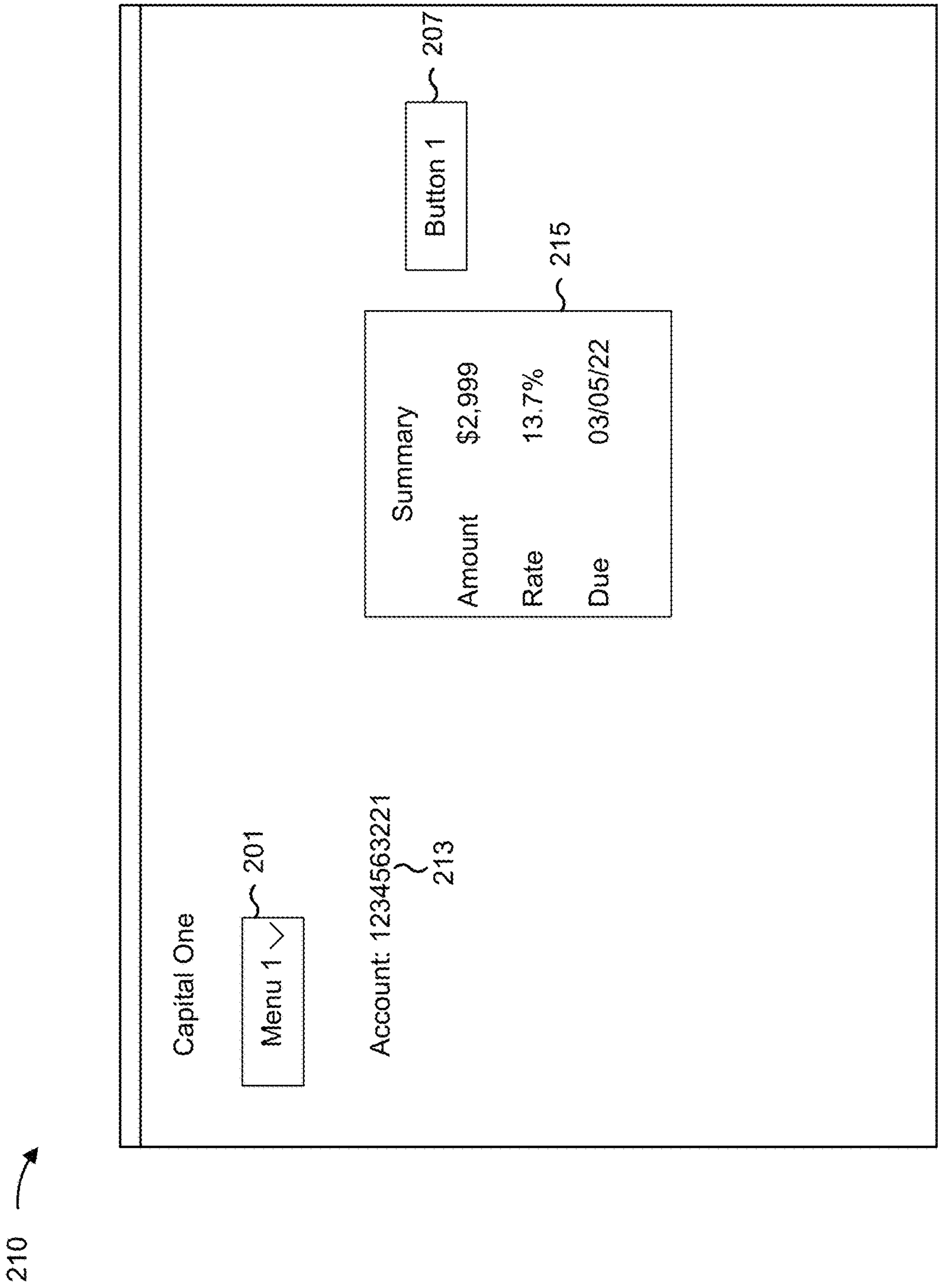
Figure 2C:
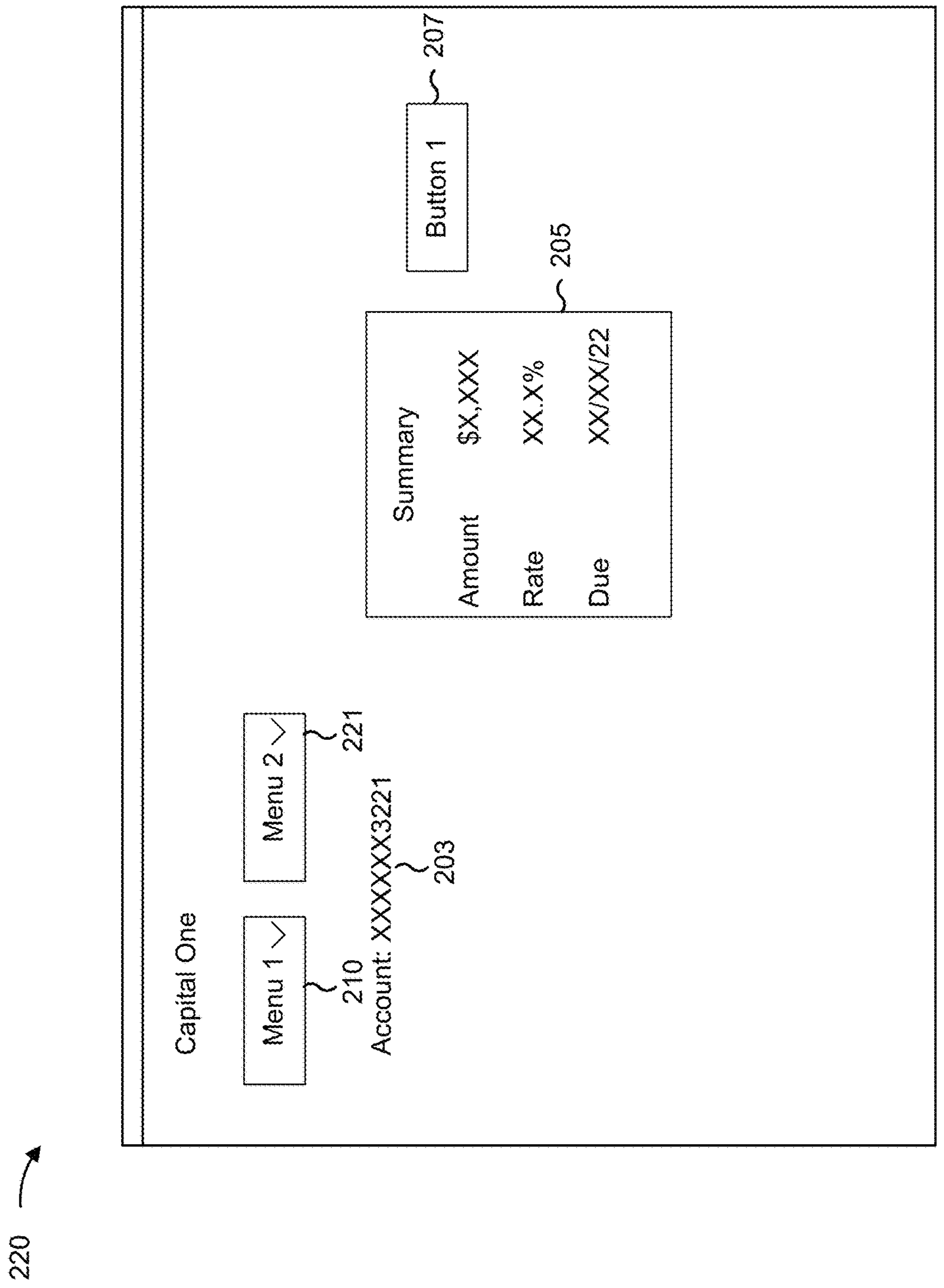
Figure 2D:
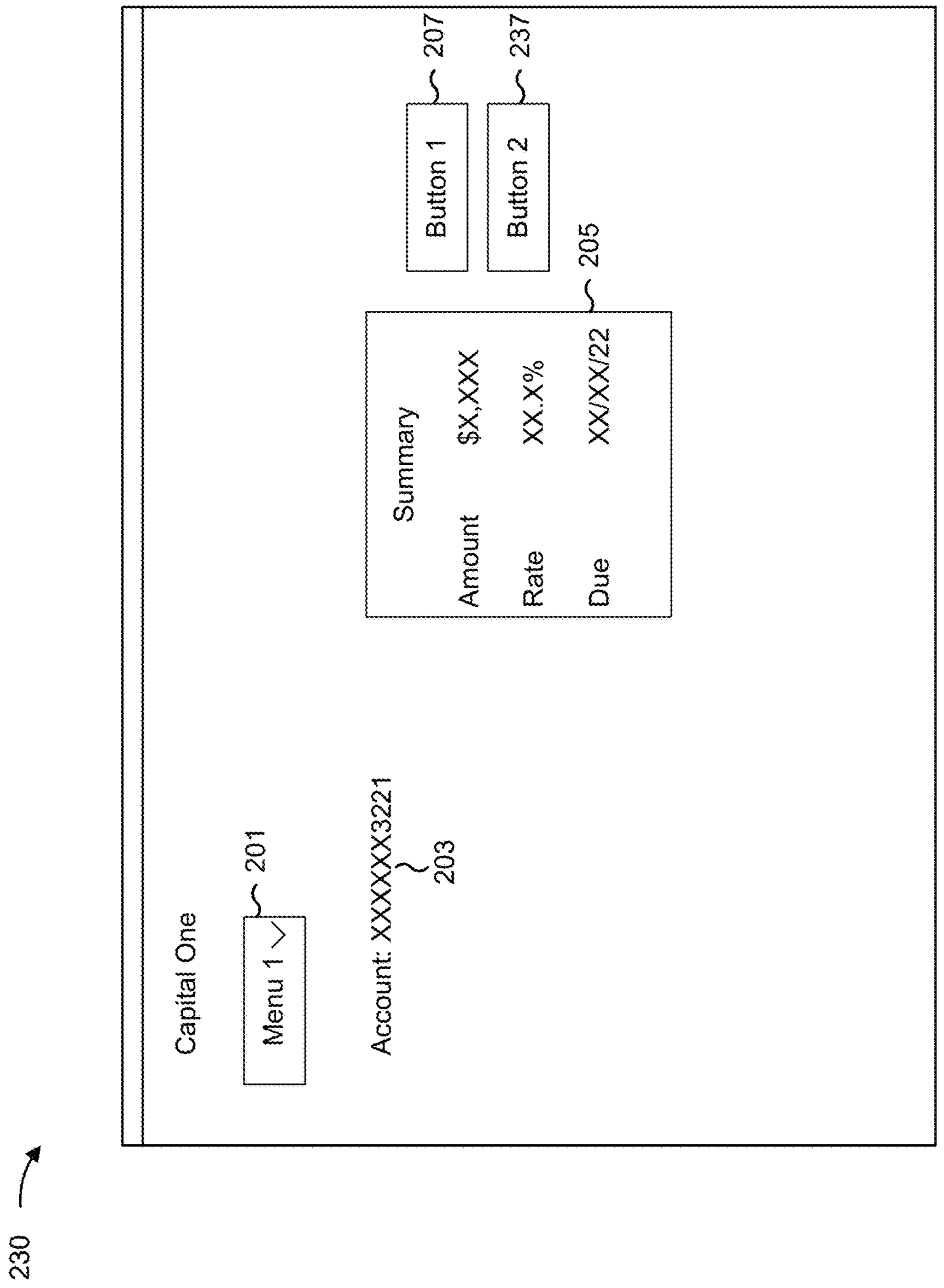

As shown in FIG. 1C and by reference number 130, the remote server may add a second set of visual components to the user interface based on the similarity score satisfying a first similarity threshold. For example, as shown in FIG. 2B, the remote server may add updated text information classified as sensitive. Additionally, or alternatively, as shown in FIG. 2C, the remote server may add a new menu (or new options to an existing menu) associated with a set of functions. Additionally, or alternatively, as shown in FIG. 2D, the remote server may add a new button associated with a single function. Accordingly, the remote server may transmit, and the mobile application may receive, instructions for updating the user interface accordingly. The added information may be associated with a first sensitivity level satisfying a first sensitivity threshold. For example, the first sensitivity threshold may be associated with the first similarity threshold.

Figure 1D:
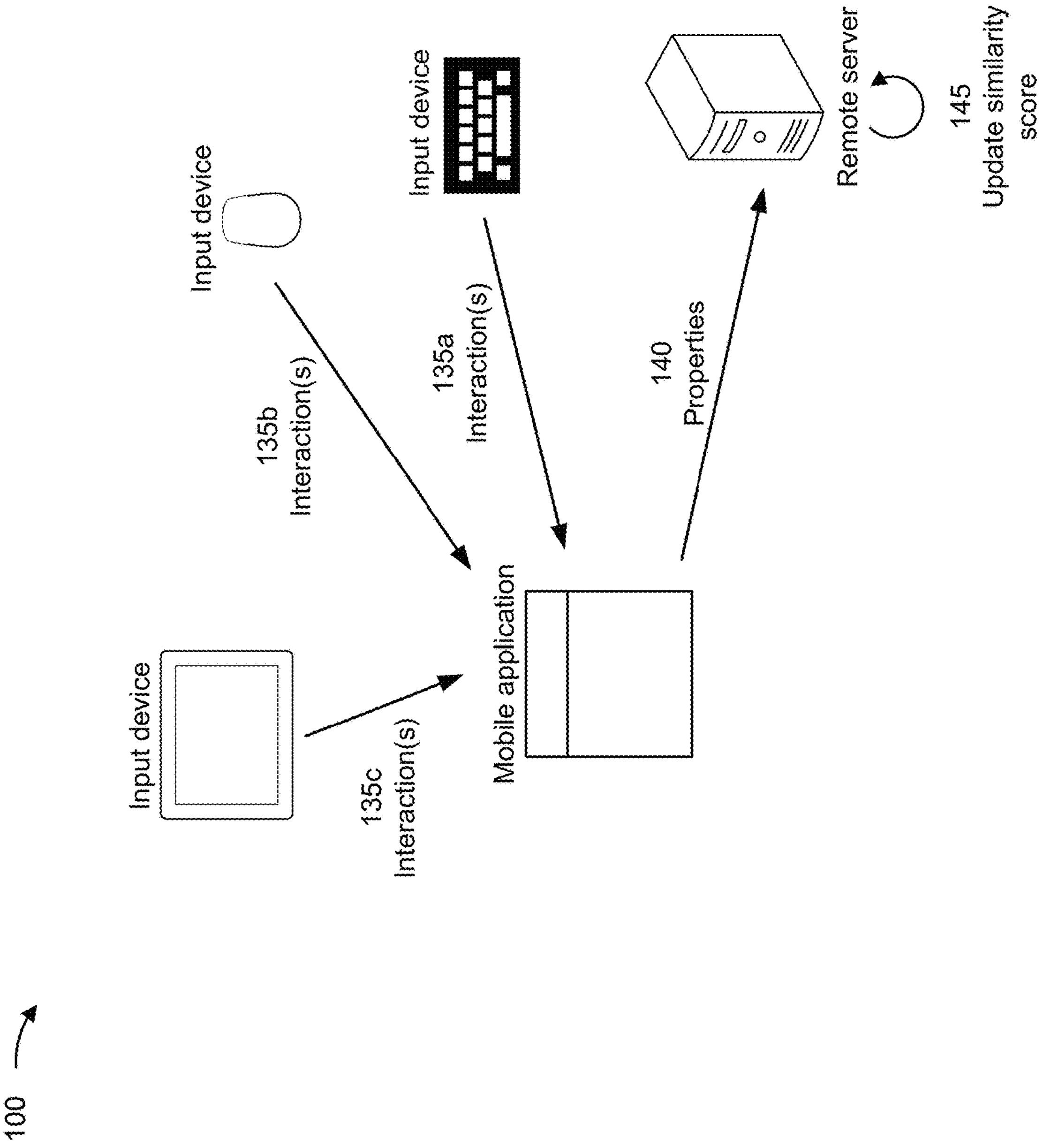

In some implementations, and as shown in FIG. 1D and by reference numbers 135*a*, 135*b*, and 135*c*, the user may engage in second interactions (e.g., one or more second interactions) with the user interface. For example, the user may use the input devices (e.g., described above) to interact with the user interface that is shown on the display of the user device. Accordingly, the user may type, click or tap, and/or scroll.

Because the mobile application transmits indications of the second interactions to the remote server, the remote server detects the second interactions during a second interval. The second interval is subsequent to the first interval and may be shorter than, longer than, or equal in length to the first interval. Additionally, as shown by reference number 140, the mobile application may transmit, and the remote server may receive, properties (e.g., one or more properties) associated with the second interactions. Alternatively, the remote server may determine the properties based on receiving indications of the second interactions from the mobile application.

Accordingly, as shown by reference number 145, the remote server may update the similarity score associated with the user based on the properties associated with the second interactions and the fingerprint associated with the user. As described above, the fingerprint may comprise a data structure that stores expected properties associated with the user. Accordingly, the remote server may determine update a plurality of values associated with a plurality of dimensions in order to update the vector based on the properties, each dimension being associated with a corresponding type of interaction (e.g., a dimension associated with typing that includes values for properties associated with typing, and so on).

Therefore, the remote server may compare the fingerprint to the updated vector in order to update the similarity score. As described above, the updated similarity score may comprise a (weighted) distance between the updated vector and the fingerprint. In another example, the updated similarity score may comprise a numerical indication of how many values in the updated vector satisfy an associated confidence threshold in the fingerprint. In some implementations, the remote server may use a machine learning model, such as a regression model, a decision tree, an artificial neural network, or another type of model to update the similarity score.

Figure 1E:
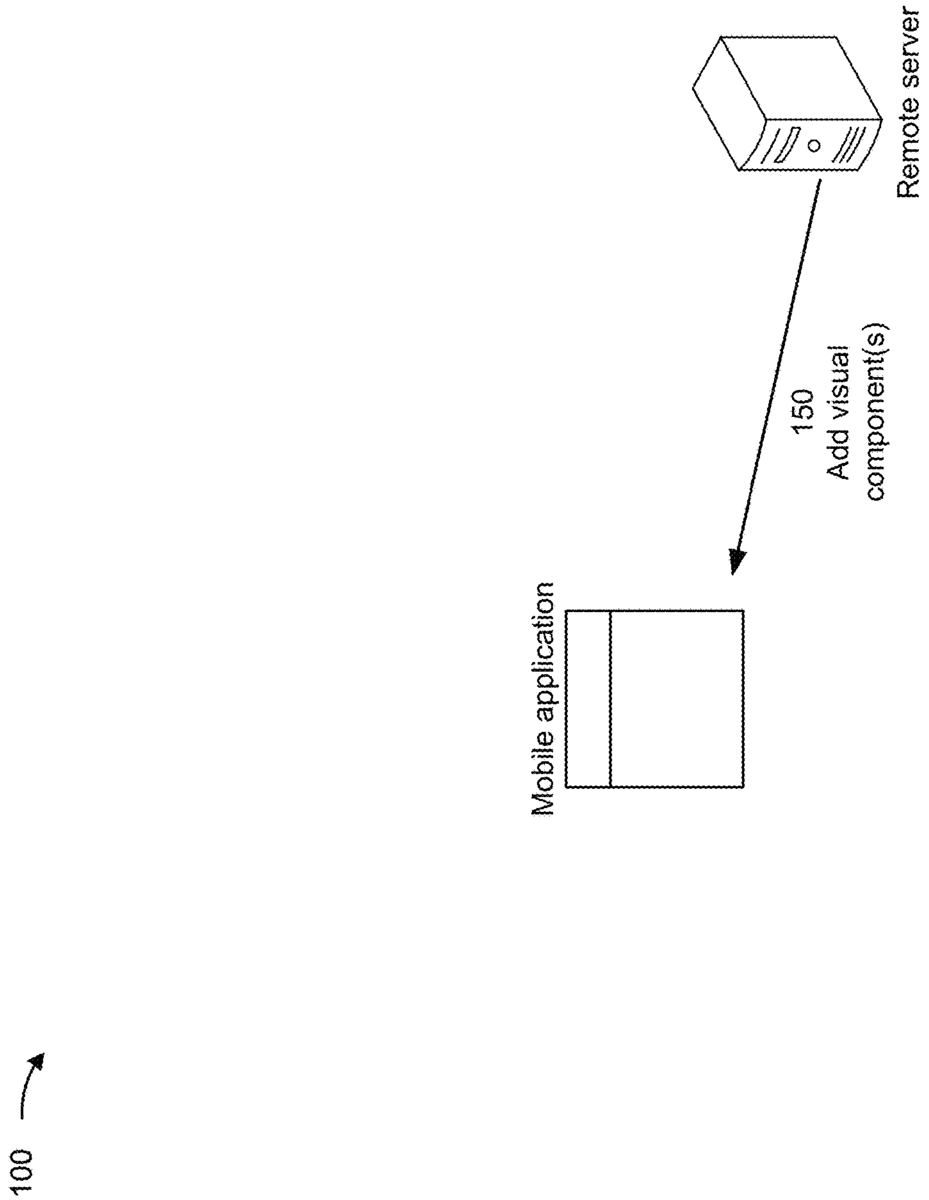

As shown in FIG. 1E and by reference number 150, the remote server may add a third set of visual components to the user interface based on the similarity score satisfying a second (e.g., higher) similarity threshold. For example, as shown in FIG. 2B, the remote server may add updated text information classified as sensitive. Additionally, or alternatively, as shown in FIG. 2C, the remote server may add a new menu (or new options to an existing menu) associated with a set of functions. Additionally, or alternatively, as shown in FIG. 2D, the remote server may add a new button associated with a single function. Accordingly, the remote server may transmit, and the mobile application may receive, instructions for updating the user interface accordingly. The added information may be associated with a second sensitivity level satisfying a second sensitivity threshold. For example, the second sensitivity threshold may be associated with the second similarity threshold.

By using techniques as described in connection with FIGS. 1A-1E, the remote server authenticates the user based on properties of the user's interactions with the user interface. As a result, the remote server can bypass some, or even all, credentials that would otherwise be provided by the user. Accordingly, the remote server conserves power and processing resources at the user device and at the remote server.

In some implementations, example 100 may be used after a lack of interaction with the user interface. A lack of interaction may include the user refraining from interacting with the user interface using any of the input devices (e.g., described above). For example, the user may refrain from moving and/or clicking a mouse, tapping and/or scrolling on a touchscreen, and/or typing on a keyboard, among other examples. In some implementations, the remote server may detect a lack of interaction, even when the user still interacts with the input devices (e.g., described above), as long as the user refrains from particular types of input. For example, the user may engage in moving a mouse but refrain from clicking, and the remote server may still detect a lack of interaction. In another example, the user may engage in scrolling on a touchscreen but refrain from tapping, and the remote server may still detect a lack of interaction. Additionally, or alternatively, the remote server may detect a lack of interaction, even when the user still interacts with the input devices (e.g., described above), as long as the user interacts with other user interfaces. For example, the user may switch to a different application on the user device and interact with a different user interface associated with the different application, and the remote server may still detect a lack of interaction with the user interface.

Accordingly, the remote server may detect, during an interval, a lack of interaction with the user interface. When the interval satisfies a time-out threshold, the remote server may remove visual components from the user interface. For example, the remote server may remove the third set of visual components based on the lack of interaction (e.g., when the interval satisfies a first time-out threshold). Similarly, the remote server may remove the second set of visual components based on a continued lack of interaction (e.g., when the interval satisfies a second time-out threshold). In some implementations, when the interval satisfies a final time-out threshold, the remote server may de-authorize the user.

On the other hand, the remote server may detect, during a subsequent interval, third interactions (e.g., one or more third interactions) with the user interface. For example, the user may use the input devices (e.g., described above) to interact with the user interface that is shown on the display of the user device. Accordingly, the user may type, click or tap, and/or scroll. The remote server may detect interaction whenever the remote server fails to detect a lack of interaction, as described above. Therefore, the remote server may re-determine the similarity score associated with the user based on properties associated with the third interactions and the fingerprint associated with the user, as described above. The remote server may restore the second set of visual components to the user interface based on the re-determined similarity score satisfying the first similarity threshold and/or restore the third set of visual components to the user interface based on the re-determined similarity score satisfying the second similarity threshold.

Accordingly, the remote server re-authenticates the user (e.g., after a timer expiry) based on properties of the user's interactions with the user interface. As a result, the remote server can bypass the user providing credentials once again. Accordingly, the remote server conserves power and processing resources at the user device and at the remote server.

Example 100 may, in some implementations, be combined with example 300 described in connection with FIGS. 3A-3F. For example, as described in connection with FIG. 3C, the remote server may remove visual components when the similarity score does not satisfy a similarity threshold. In some implementations, a similarity threshold may be increased or decreased by a hysteresis value when the remote server is determining to remove visual components that were previously added based on the similarity threshold. Alternatively, as described in connection with FIG. 3E, the remote server may prompt the user for credentials when the similarity score does not satisfy a similarity threshold.

As indicated above, FIGS. 1A-1E are provided as an example. Other examples may differ from what is described with regard to FIGS. 1A-1E.

FIGS. 2A-2D are diagrams of example user interfaces associated with interaction-based authentication. As shown in FIG. 2A, example user interface 200 includes a menu 201, text information 203, a text insert 205, and a button 207. The menu 201 may be associated with a set of functions, and the button 207 may be associated with a single function. The text information 203 may be partially obscured, as shown in FIG. 2A, because the text information 203 is sensitive. Similarly, the text insert 205 may be partially obscured, as shown in FIG. 2A, because the text therein is sensitive.

As shown in FIG. 2B, example user interface 210 includes a menu 201, text information 213, a text insert 215, and a button 207. The text information 213 is revealed, as shown in FIG. 2B, because a similarity score has satisfied a similarity threshold associated with a sensitivity level of the text information 213. Similarly, the text insert 205 is revealed, as shown in FIG. 2B, because a similarity score has satisfied a similarity threshold associated with a sensitivity level of the text therein. Accordingly, in example user interface 210, the text information 213 and the text in the text insert 215 are associated with the same sensitivity level. Other examples may include multiple sensitivity levels for different text in the user interface.

As shown in FIG. 2C, example user interface 220 includes a menu 201, an additional menu 221, text information 203, a text insert 205, and a button 207. The additional menu 221 may be associated with an additional set of functions that is classified as sensitive. Accordingly, the additional menu 221 is visible because a similarity score has satisfied a similarity threshold associated with a sensitivity level of the additional set of functions.

As shown in FIG. 2D, example user interface 220 includes a menu 201, text information 203, a text insert 205, a button 207, and an additional button 237. The additional button 237 may be associated with an additional function that is classified as sensitive. Accordingly, the additional button 237 is visible because a similarity score has satisfied a similarity threshold associated with a sensitivity level of the additional function.

As indicated above, FIGS. 2A-2D are provided as examples. Other examples may differ from what is described with regard to FIGS. 2A-2D.

FIGS. 3A-3F are diagrams of an example 300 associated with interaction-based authentication and user interface adjustment. As shown in FIGS. 3A-3F, example 300 includes a mobile application (e.g., supported by an operating system of a user device), a remote server, and one or more input devices (e.g., that are hardware components or peripherals of the user device). These devices are described in more detail in connection with FIGS. 5 and 6.

As shown by reference number 305, the mobile application may transmit, and the remote server may receive, credentials (e.g., one or more credentials) associated with a user of the user device. For example, the credentials may include a username and password, a PIN, a biometric identification, or another type of information that is unique (or at least quasi-unique) to the user. The mobile application may encrypt the credentials before transmitting (e.g., using a public key or a type of symmetric encryption), and the remote server may decrypt the credentials (e.g., using a private key). Accordingly, the remote server may authenticate the user based on the credentials.

In some implementations, the credentials may be transmitted with a request for content. For example, the mobile application may transmit an HTTP request, an FTP request, or another type of request associated with an application layer of the user device, that includes the credentials. Alternatively, the credentials may be transmitted in response to a prompt from the remote server. For example, the mobile application may transmit an HTTP request, an FTP request, or type of request associated with the application layer, and the remote server may transmit a prompt for credentials. Accordingly, the mobile application may transmit the credentials based on the prompt (e.g., based on input from the user in response to displaying the prompt to the user). Alternatively, the mobile application may transmit the request for content without credentials.

As shown by reference number 310, the remote server may transmit, and the mobile application may receive, instructions for generating a user interface. The user interface may include a first set of visual components, such as text, a drop-down menu, a button, a text box, radio buttons, an image, or another type of GUI component.

Figure 3A:
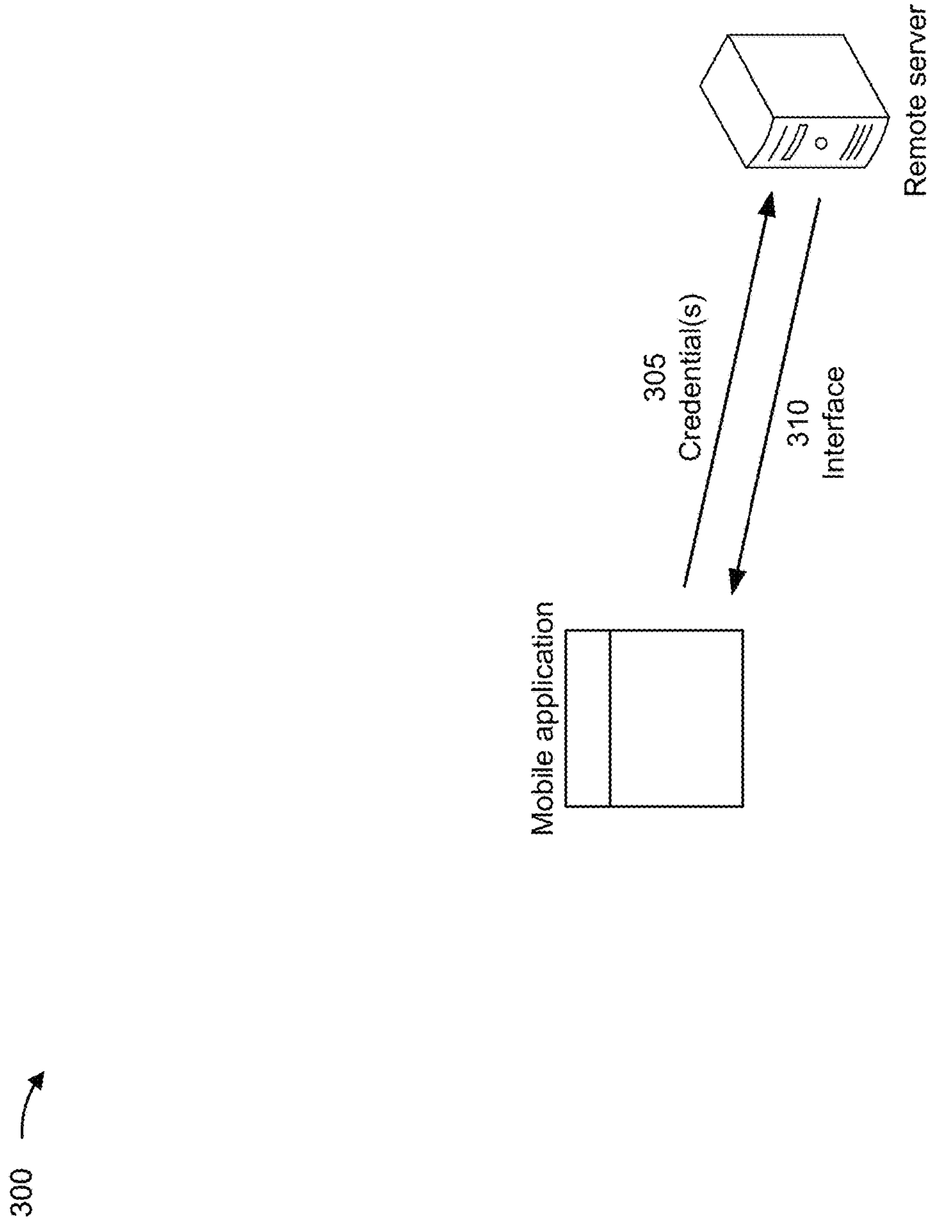
FIGS. 3A-3F are diagrams of an example implementation relating to interaction-based authentication and user interface adjustment, in accordance with some embodiments of the present disclosure.
Figure 3B:
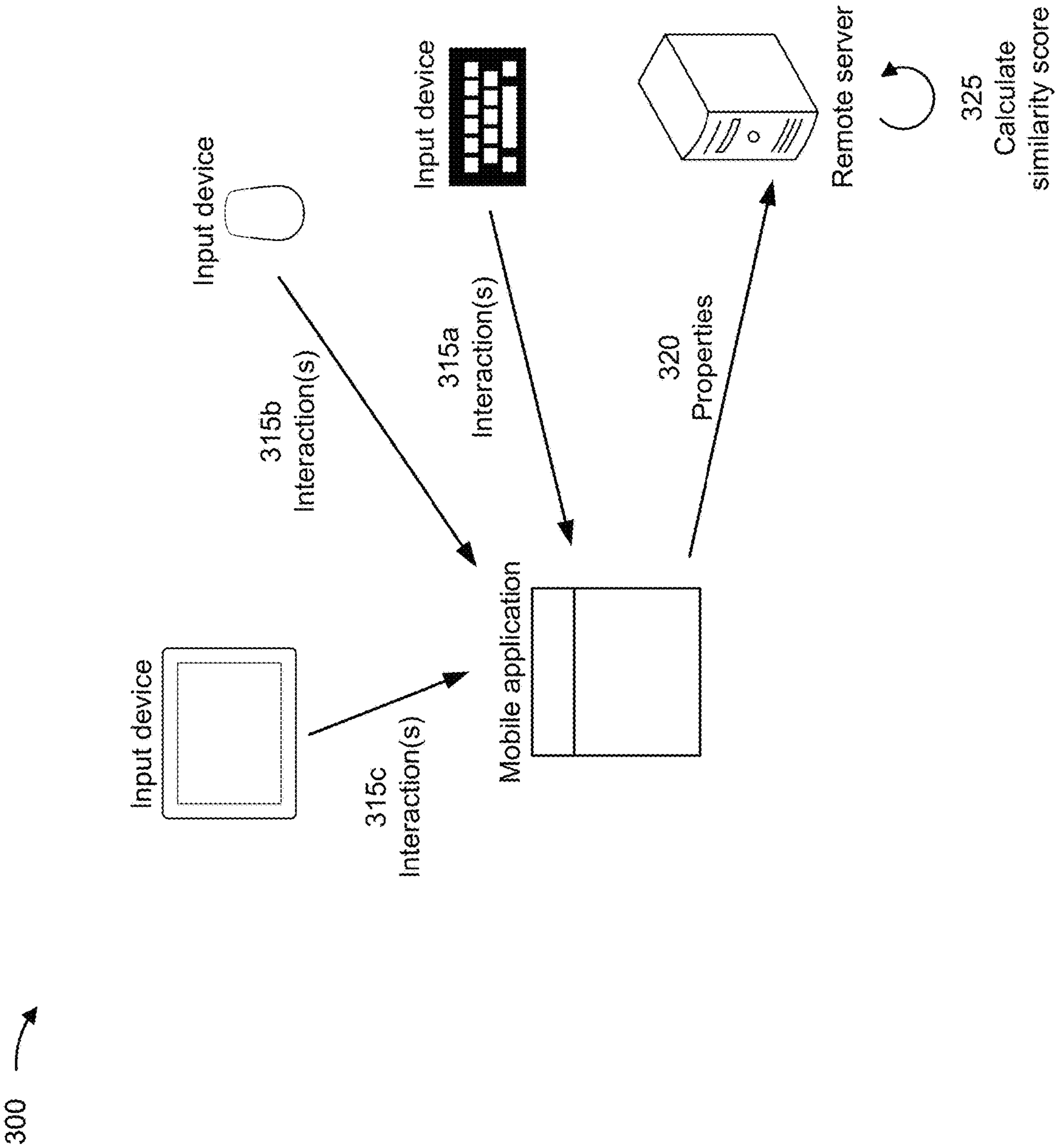

As shown in FIG. 3B and by reference numbers 315*a*, 315*b*, and 315*c*, the user may engage in first interactions (e.g., one or more first interactions) with the user interface. For example, the user may use input devices (e.g., one or more input devices) to interact with the user interface that is shown on a display of the user device. The input devices may include a touchscreen, a mouse, a keyboard, a microphone (e.g., for voice commands), or another type of device that generates electrical signals in response to stimulus from the user. Accordingly, the user may type, click or tap, and/or scroll.

Because the mobile application transmits indications of the first interactions to the remote server, the remote server detects the first interactions during a first interval. Additionally, as shown by reference number 320, the mobile application may transmit, and the remote server may receive, properties (e.g., one or more properties) associated with the first interactions. For example, the properties may include statistics regarding the first interactions, such as pixel zones associated with the first interactions, a quantity of clicks or taps within a time period, a typing speed, or a scrolling speed, among other examples. Additionally, or alternatively, the properties may include derived measurements, such as a typing cadence (e.g., a burst pattern associated with typing), a spelling record (e.g., a rate of misspells and/or general misspell patterns), a clicking or tapping pattern (e.g., a burst pattern associated with clicking or tapping), or a set of steps associated with a process (e.g., using Ctrl+C to copy and Ctrl+V to copy-and-paste, right-click menus to copy-and-paste, or a menu associated with the mobile application to copy-and-paste; using a tap and dragging selectors to select a phrase or a double tap to select the phrase; or using a scroll wheel to scroll, arrow keys to scroll, or clicking a scroll bar to scroll), among other examples. Alternatively, the remote server may determine the properties based on receiving indications of the first interactions from the mobile application.

Accordingly, as shown by reference number 325, the remote server may calculate a similarity score associated with the user based on the properties associated with the first interactions and a fingerprint associated with the user. For example, the fingerprint may comprise a data structure that stores expected properties associated with the user. Accordingly, the remote server may determine a plurality of values associated with a plurality of dimensions in order to generate a vector based on the properties, each dimension being associated with a corresponding type of interaction (e.g., a dimension associated with typing that includes values for properties associated with typing, and so on).

Therefore, the remote server may compare the fingerprint to the vector in order to generate the similarity score. For example, the similarity score may comprise a (weighted) distance between the vector and the fingerprint. In another example, the similarity score may comprise a numerical indication of how many values in the vector satisfy an associated confidence threshold in the fingerprint. In some implementations, the remote server may use a machine learning model, such as a regression model, a decision tree, an artificial neural network, or another type of model to determine the similarity score.

Figure 3C:
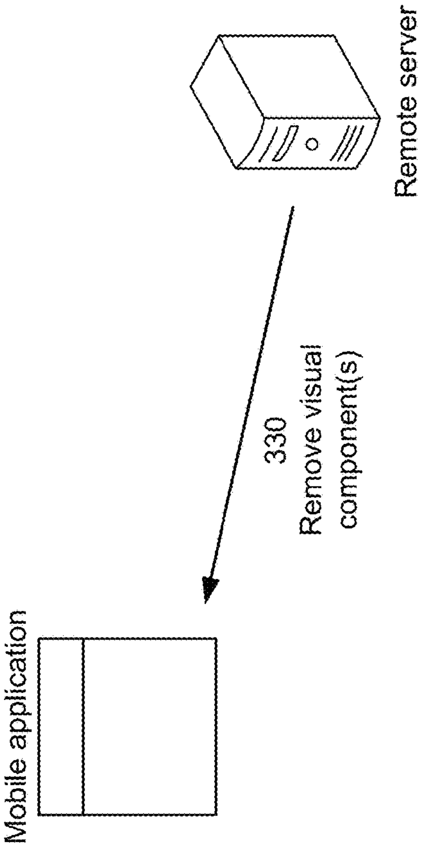

As shown in FIG. 3C and by reference number 330, the remote server may remove a first set of visual components to the user interface based on the similarity score failing to satisfy a first similarity threshold. For example, as shown in FIG. 4B, the remote server may remove a menu (or remove options from an existing menu) associated with a set of functions. Additionally, or alternatively, as shown in FIG. 4C, the remote server may remove a button associated with a single function. Additionally, or alternatively, as shown in FIG. 4D, the remote server may obscure or remove text information classified as sensitive. Accordingly, the remote server may transmit, and the mobile application may receive, instructions for updating the user interface accordingly. The removed or obscured information may be associated with a first sensitivity level satisfying a first sensitivity threshold. For example, the first sensitivity threshold may be associated with the first similarity threshold.

Figure 3D:
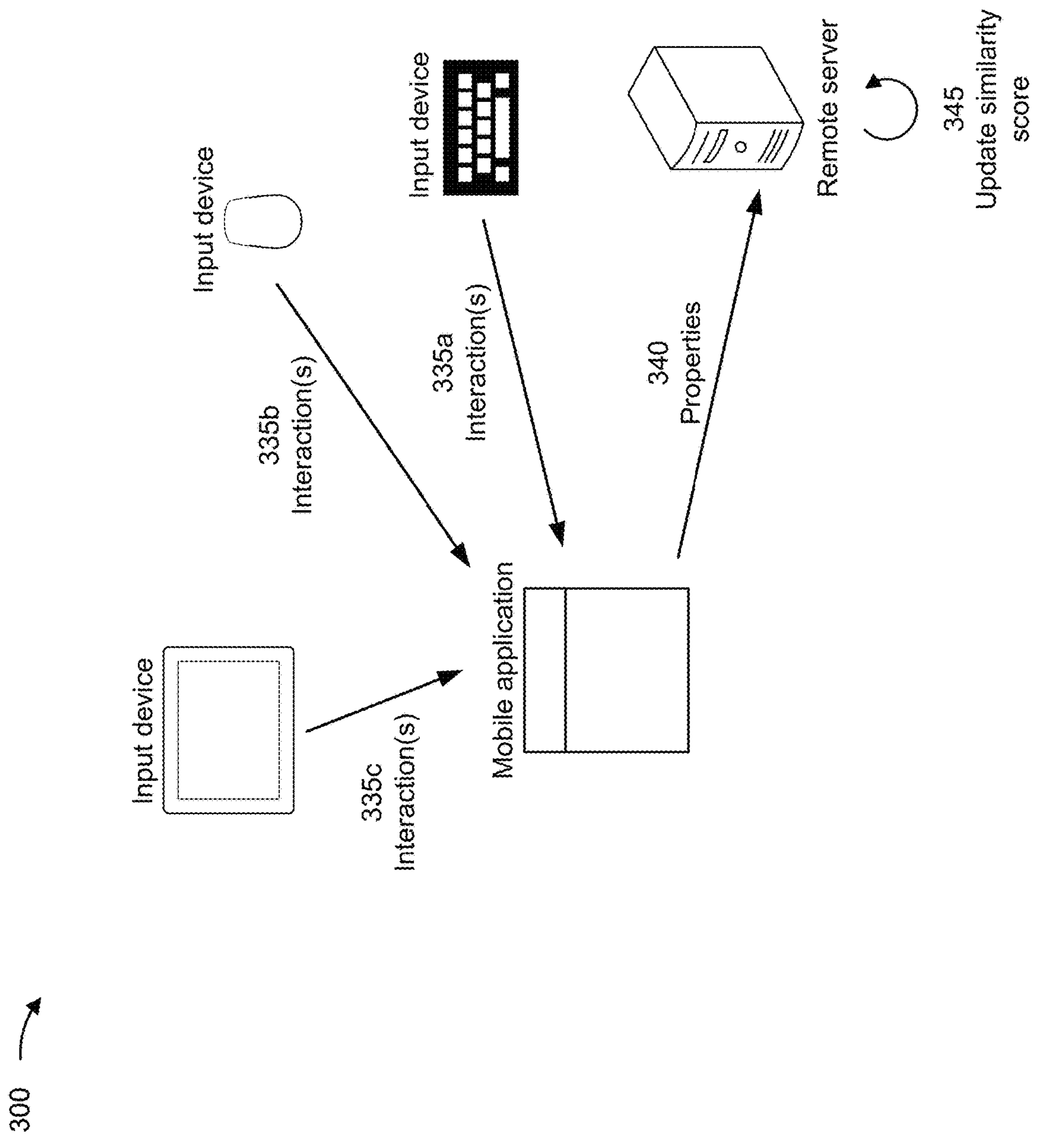

In some implementations, and as shown in FIG. 3D and by reference numbers 335*a*, 335*b*, and 335*c*, the user may engage in second interactions (e.g., one or more second interactions) with the user interface. For example, the user may use the input devices (e.g., described above) to interact with the user interface that is shown on the display of the user device. Accordingly, the user may type, click or tap, and/or scroll.

Because the mobile application transmits indications of the second interactions to the remote server, the remote server detects the second interactions during a second interval. The second interval is subsequent to the first interval and may be shorter than, longer than, or equal in length to the first interval. Additionally, as shown by reference number 340, the mobile application may transmit, and the remote server may receive, properties (e.g., one or more properties) associated with the second interactions. Alternatively, the remote server may determine the properties based on receiving indications of the second interactions from the mobile application.

Accordingly, as shown by reference number 345, the remote server may update the similarity score associated with the user based on the properties associated with the second interactions and the fingerprint associated with the user. As described above, the fingerprint may comprise a data structure that stores expected properties associated with the user. Accordingly, the remote server may determine update a plurality of values associated with a plurality of dimensions in order to update the vector based on the properties, each dimension being associated with a corresponding type of interaction (e.g., a dimension associated with typing that includes values for properties associated with typing, and so on).

Therefore, the remote server may compare the fingerprint to the updated vector in order to update the similarity score. As described above, the updated similarity score may comprise a (weighted) distance between the updated vector and the fingerprint. In another example, the updated similarity score may comprise a numerical indication of how many values in the updated vector satisfy an associated confidence threshold in the fingerprint. In some implementations, the remote server may use a machine learning model, such as a regression model, a decision tree, an artificial neural network, or another type of model to update the similarity score.

Figure 3E:
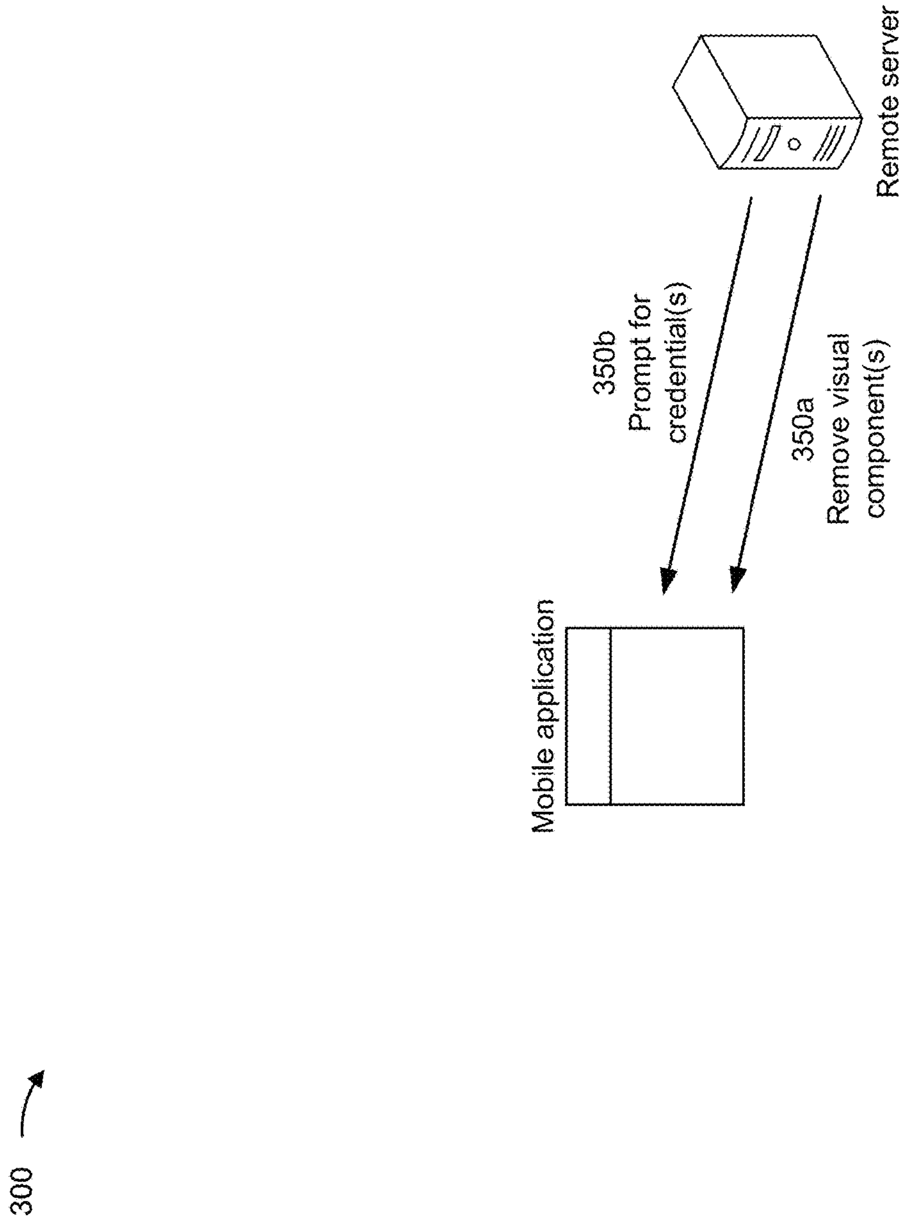

As shown in FIG. 3E and by reference number 350*a*, the remote server may remove a second set of visual components to the user interface based on the similarity score failing to satisfy a second (e.g., lower) similarity threshold. For example, as shown in FIG. 4B, the remote server may remove a menu (or remove options from an existing menu) associated with a set of functions. Additionally, or alternatively, as shown in FIG. 4C, the remote server may remove a button associated with a single function. Additionally, or alternatively, as shown in FIG. 4D, the remote server may obscure or remove text information classified as sensitive. Accordingly, the remote server may transmit, and the mobile application may receive, instructions for updating the user interface accordingly. The removed or obscured information may be associated with a second sensitivity level satisfying a second sensitivity threshold. For example, the second sensitivity threshold may be associated with the second similarity threshold.

Figure 3F:
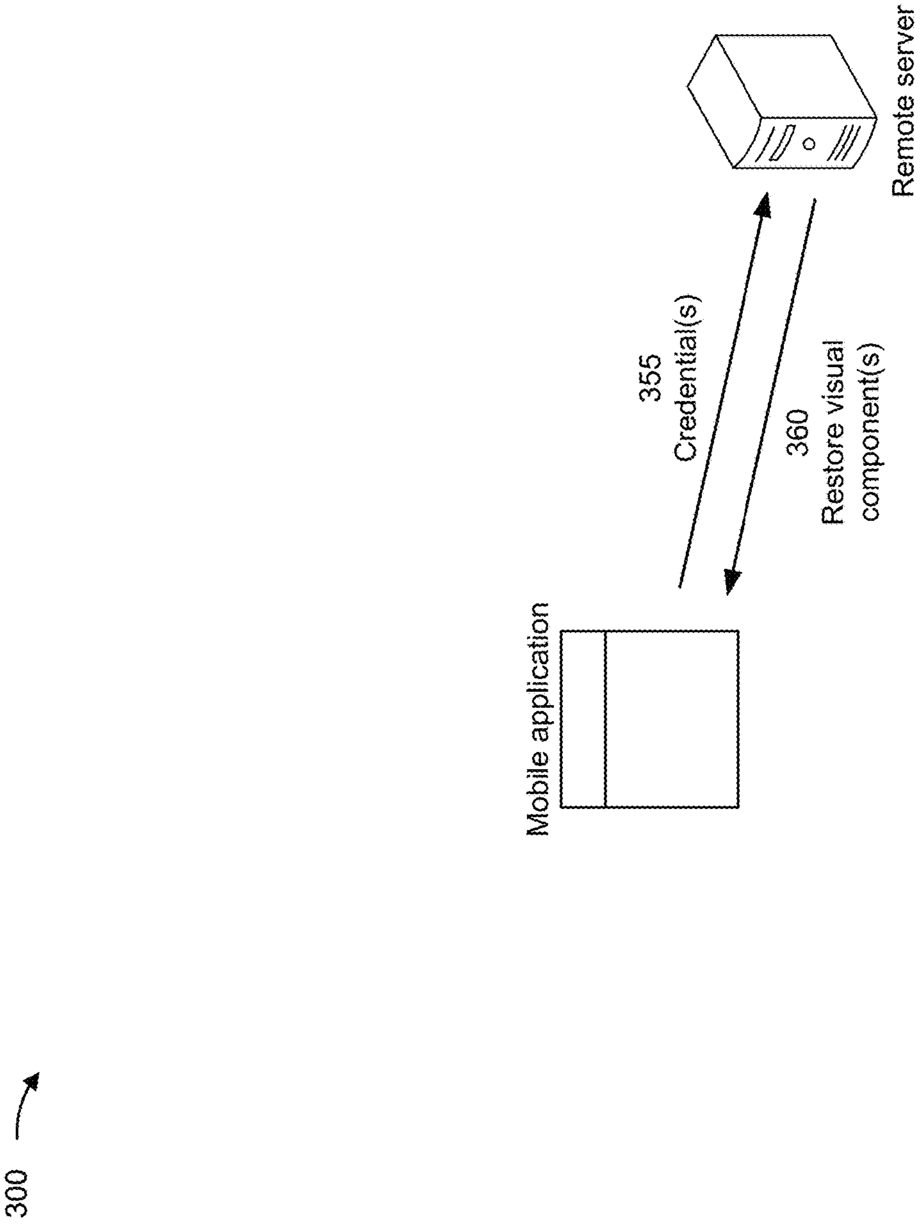

Alternatively, as shown by reference number 350*b*, the remote server may transmit, and the mobile application may receive, a prompt for credentials. For example, the remote server may request two-factor authorization, entry of a username and password, an answer to a secret question, and/or another type of answer from the user. Accordingly, as shown in FIG. 3F and by reference number 355, the mobile application may transmit, and the remote server may receive, credentials associated with the user in response to removal of the first set of visual components and/or the second set of visual components. In some implementations, the remote server may receive the credentials in response to the prompt.

Therefore, as shown by reference number 360, the remote server may restore the first set of visual components and/or the second set of visual components based on authenticating the user with the credentials. For example, the remote server may transmit, and the mobile application may receive, instructions for updating the user interface accordingly.

By using techniques as described in connection with FIGS. 3A-3F, the remote server de-authenticates the user based on properties of the user's interactions with the user interface. As a result, the remote server increases security by detecting when an intruder is using an already-active session on the user device.

In some implementations, example 300 may be used after a lack of interaction with the user interface. For example, the remote server may detect, during an interval, a lack of interaction with the user interface. When the interval satisfies a time-out threshold, the remote server may remove visual components from the user interface. For example, the remote server may remove one set of visual components based on the lack of interaction (e.g., when the interval satisfies a first time-out threshold). Similarly, the remote server may remove another set of visual components based on a continued lack of interaction (e.g., when the interval satisfies a second time-out threshold). In some implementations, when the interval satisfies a final time-out threshold, the remote server may de-authorize the user.

On the other hand, the remote server may detect, during a subsequent interval, the first interactions with the user interface. Therefore, the remote server may continue to remove the first set of visual components and/or the second set of visual components based on properties associated with the first interactions and/or the second interactions, respectively, and the fingerprint associated with the user, as described above. As a result, the remote server increases security by detecting when an intruder is using an already-active session on the user device.

Example 300 may, in some implementations, be combined with example 100 described in connection with FIGS. 1A-1E. For example, as described in connection with FIG. 1C, the remote server may add visual components when the similarity score does satisfy a similarity threshold. In some implementations, a similarity threshold may be increased or decreased by a hysteresis value when the remote server is determining to add visual components that were previously removed based on the similarity threshold.

As indicated above, FIGS. 3A-3F are provided as an example. Other examples may differ from what is described with regard to FIGS. 3A-3F.

Figure 4A:
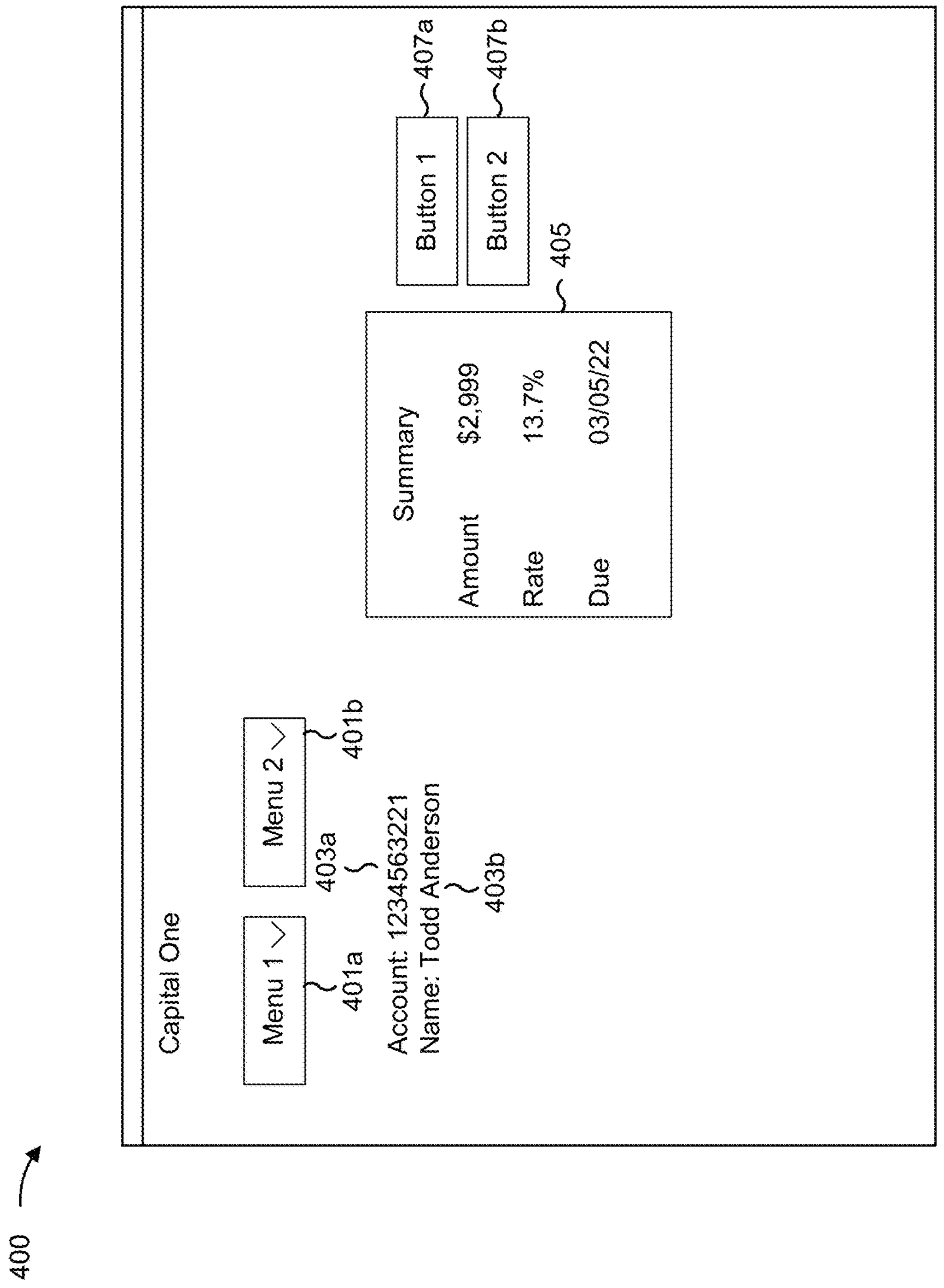
FIGS. 4A-4D are diagrams of example user interfaces, in accordance with some embodiments of the present disclosure.
Figure 4B:
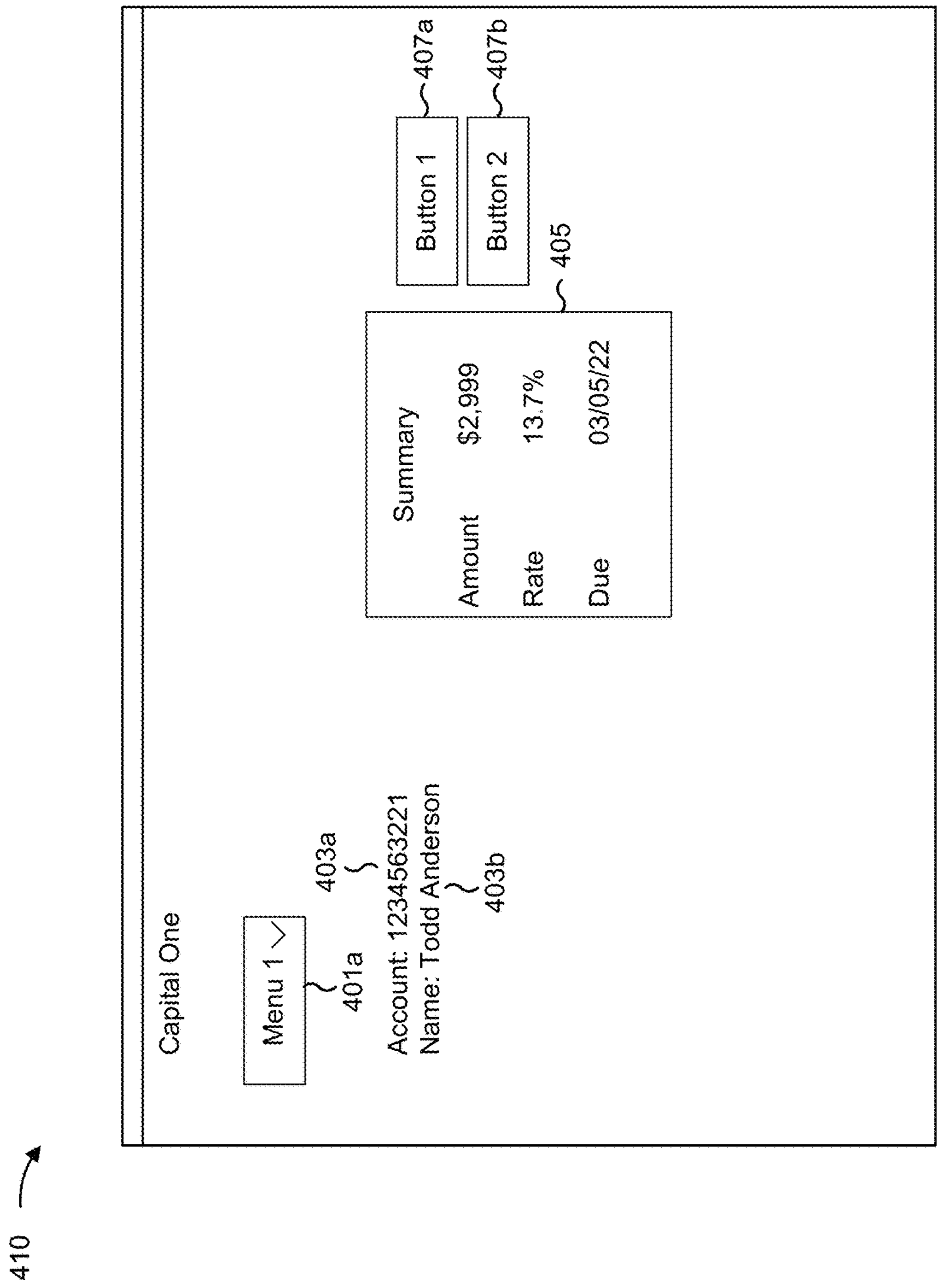
Figure 4C:
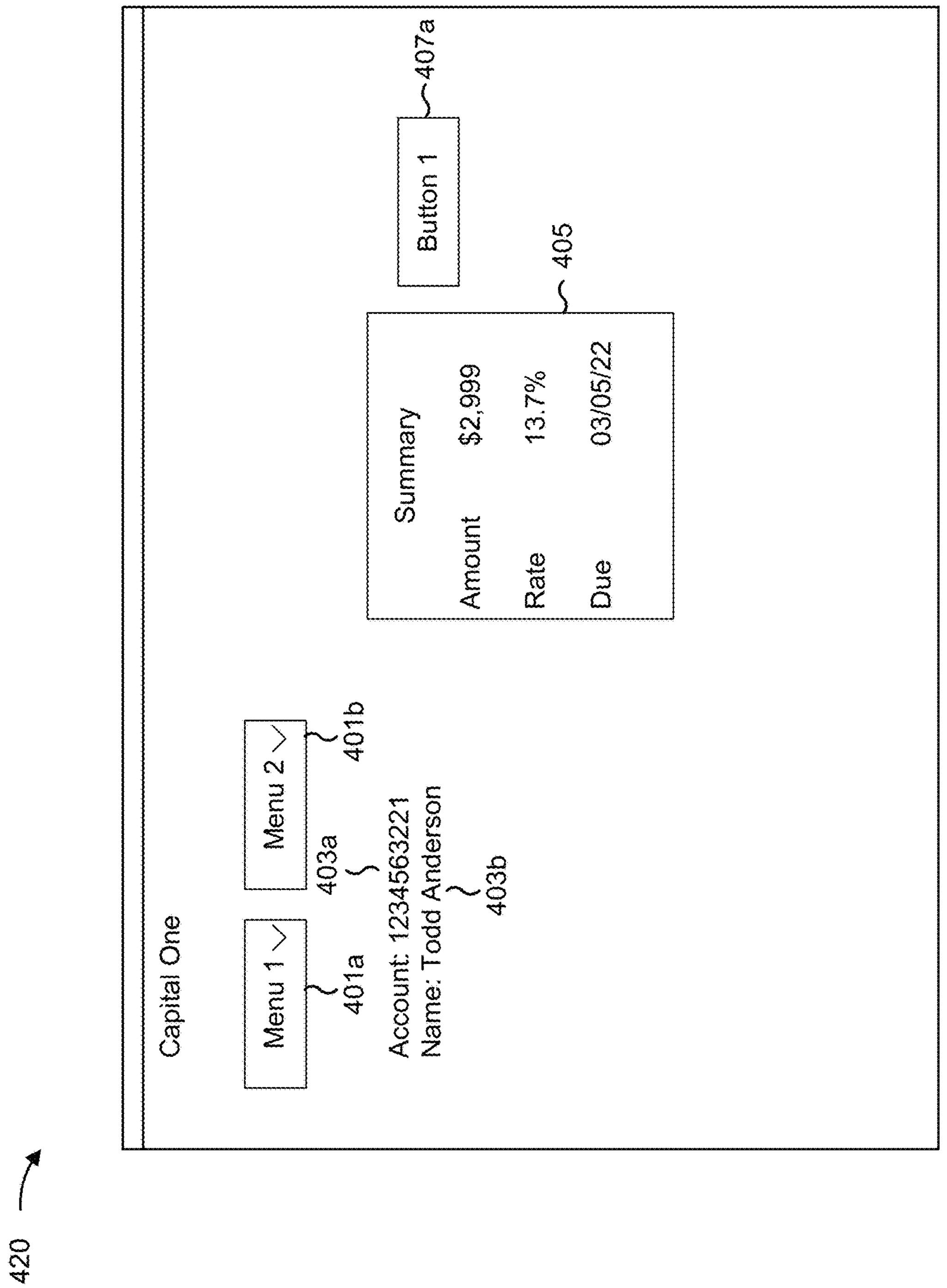
Figure 4D:
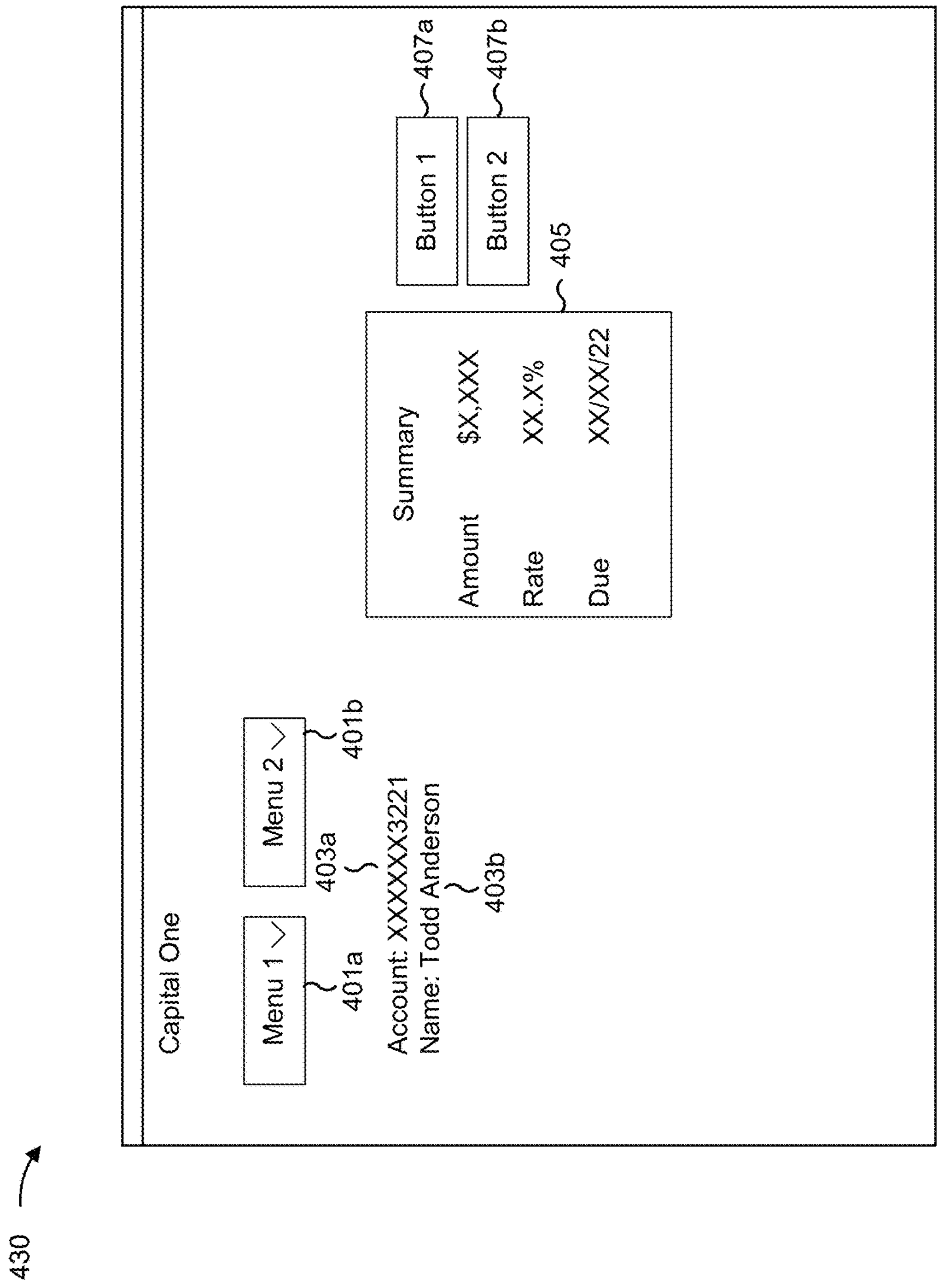

FIGS. 4A-4D are diagrams of example user interfaces associated with interaction-based authentication. As shown in FIG. 4A, example user interface 400 includes a first menu 401*a*, a second menu 401*b*, first text information 403*a*, second text information 403*b*, a text insert 405, a first button 407*a*, and a second button 407*b*. Each menu 401 may be associated with a corresponding set of functions, and each button 407 may be associated with a corresponding function.

As shown in FIG. 4B, example user interface 410 omits the second menu 401*b* because a similarity score has failed to satisfy a similarity threshold associated with a sensitivity level of the set of functions associated with the second menu 401*b*. Accordingly, in example user interface 410, the set of functions associated with the second menu 401*b* and the set of functions associated with the first menu 401*a* are associated with different sensitivity levels.

As shown in FIG. 4C, example user interface 420 omits the second button 407*b* because a similarity score has failed to satisfy a similarity threshold associated with a sensitivity level of the function associated with the second button 407*b*. Accordingly, in example user interface 420, the function associated with the second button 407*b* and the function associated with the first button 407*a* are associated with different sensitivity levels.

As shown in FIG. 4D, example user interface 430 obscures the first text information 403*a* because a similarity score has failed to satisfy a similarity threshold associated with a sensitivity level of the first text information 403*a*. Accordingly, in example user interface 430, the first text information 403*a* and the second text information 403*b* are associated with different sensitivity levels.

As indicated above, FIGS. 4A-4D are provided as examples. Other examples may differ from what is described with regard to FIGS. 4A-4D.

Figure 5:
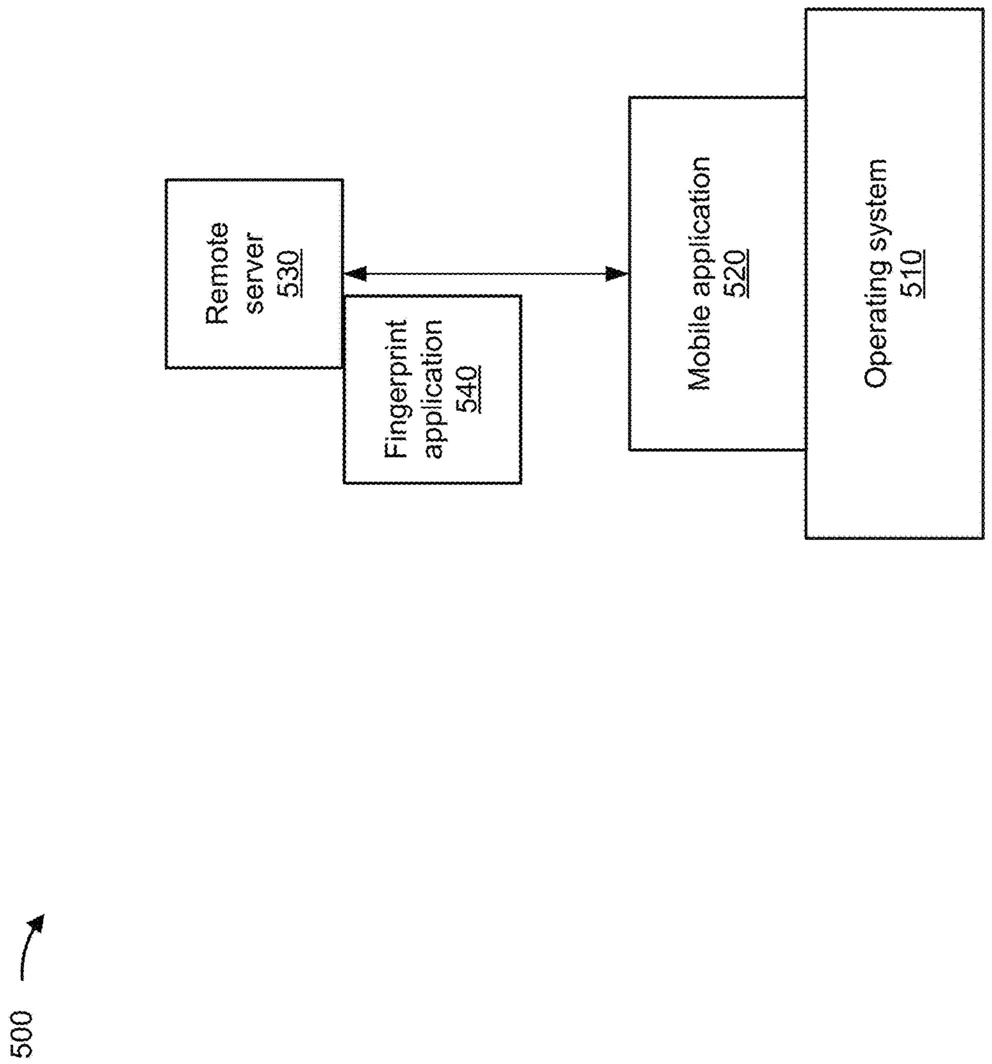
FIG. 5 is a diagram of an example environment in which systems and/or methods described herein may be implemented, in accordance with some embodiments of the present disclosure.

FIG. 5 is a diagram of an example environment 500 in which systems and/or methods described herein may be implemented. As shown in FIG. 5, environment 500 may include an operating system 510 and a mobile application 520 (e.g., supported by the operating system 510), as described in more detail below. The operating system 510 and the mobile application 520 may be executed on a user device. The user device may include a communication device. For example, the user device may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. The user device may include a display to show user interfaces to a user. The user device may further include at least one input device to facilitate interaction with a user. Example input devices include a microphone, a keyboard, a touchscreen, and/or a mouse. Additionally, as further shown in FIG. 5, environment 500 may include a remote server 530 implementing a fingerprint application 540. Devices and/or elements of environment 500 may interconnect via wired connections and/or wireless connections.

Figure 6:
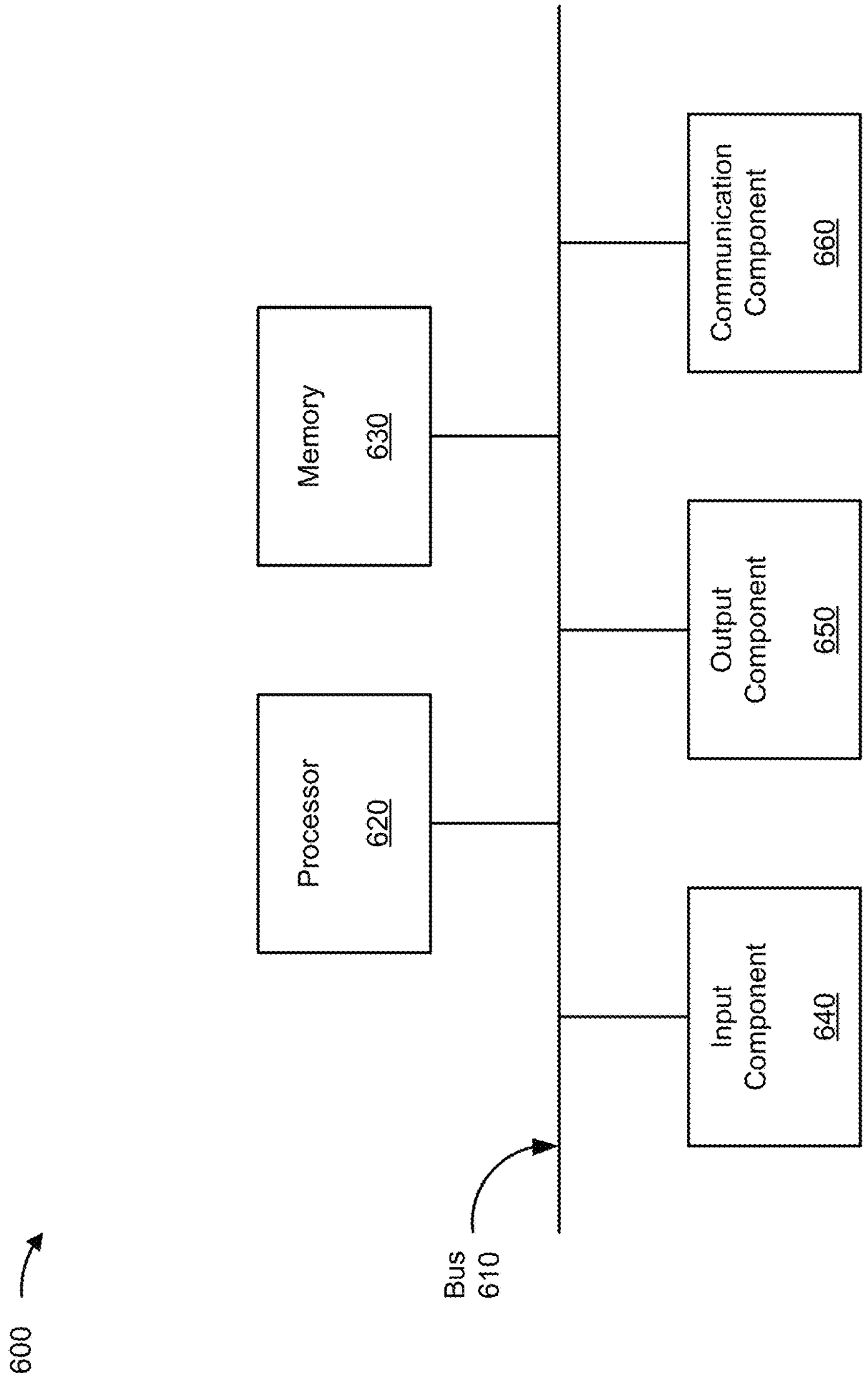
FIG. 6 is a diagram of example components of one or more devices of FIG. 5, in accordance with some embodiments of the present disclosure.

The operating system 510 may include system software capable of managing hardware of the user device (which may include, for example, one or more components of device 600 of FIG. 6) and providing an environment for execution of higher-level software, such as the mobile application 520. For example, the operating system 510 may include a kernel (e.g., a Windows-based kernel, a Linux kernel, a Unix-based kernel, such as an Android kernel, an iOS kernel, and/or another type of kernel) managing the hardware and library functions that may be used by the higher-level software. The operating system 510 may additionally provide a GUI and process input from a user. In some implementations, the operating system 510 may additionally provide network functions (e.g., for communicating with the remote server 530).

The mobile application 520 may include an executable capable of running on a user device using the operating system 510. In some implementations, the mobile application 520 may communicate with the remote server 530. For example, the mobile application 520 may use HTTP, FTP, and/or other Internet- or network-based protocols to request information from, transmit information to, and receive information from the remote server 530.

The remote server 530 may include remote computing devices that provide information to requesting devices over the Internet and/or another network (e.g., a cellular network, a public land mobile network (PLMN), a local area network (LAN), a wide area network (WAN), a private network, the Internet, and/or a combination of these or other types of networks). The remote server 530 may include a standalone server, one or more servers included on a server farm, or one or more servers spread across a plurality of server farms. In some implementations, the remote server 530 may include a cloud computing system. As an alternative, the remote server 530 may include one or more devices, such as device 600 of FIG. 6, that may include a standalone server or another type of computing device.

The fingerprint application 540 may include an executable or another type of software capable of running on the remote server 530. In some implementations, the fingerprint application 540 may calculate (and update) similarity scores associated with the user device based on interactions of a user with the input devices of the user device. Accordingly, the fingerprint application 540 may manage (or at least access) a stored fingerprint associated with the user.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

FIG. 6 is a diagram of example components of a device 600 associated with interaction-based authentication and user interface adjustment. Device 600 may correspond to a remote server (e.g., implementing a fingerprint application) and/or a user device (e.g., implementing an operating system and a mobile application). In some implementations, a remote server and/or a user device may include one or more devices 600 and/or one or more components of device 600. As shown in FIG. 6, device 600 may include a bus 610, a processor 620, a memory 630, an input component 640, an output component 650, and a communication component 660.

Bus 610 may include one or more components that enable wired and/or wireless communication among the components of device 600. Bus 610 may couple together two or more components of FIG. 6, such as via operative coupling, communicative coupling, electronic coupling, and/or electric coupling. Processor 620 may include a central processing unit, a graphics processing unit, a microprocessor, a controller, a microcontroller, a digital signal processor, a field-programmable gate array, an application-specific integrated circuit, and/or another type of processing component. Processor 620 may be implemented in hardware, firmware, or a combination of hardware and software. In some implementations, processor 620 may include one or more processors capable of being programmed to perform one or more operations or processes described elsewhere herein.

Memory 630 may include volatile and/or nonvolatile memory. For example, memory 630 may include random access memory (RAM), read only memory (ROM), a hard disk drive, and/or another type of memory (e.g., a flash memory, a magnetic memory, and/or an optical memory). Memory 630 may include internal memory (e.g., RAM, ROM, or a hard disk drive) and/or removable memory (e.g., removable via a universal serial bus connection). Memory 630 may be a non-transitory computer-readable medium. Memory 630 stores information, instructions, and/or software (e.g., one or more software applications) related to the operation of device 600. In some implementations, memory 630 may include one or more memories that are coupled to one or more processors (e.g., processor 620), such as via bus 610.

Input component 640 enables device 600 to receive input, such as user input and/or sensed input. For example, input component 640 may include a touch screen, a keyboard, a keypad, a mouse, a button, a microphone, a switch, a sensor, a global positioning system sensor, an accelerometer, a gyroscope, and/or an actuator. Output component 650 enables device 600 to provide output, such as via a display, a speaker, and/or a light-emitting diode. Communication component 660 enables device 600 to communicate with other devices via a wired connection and/or a wireless connection. For example, communication component 660 may include a receiver, a transmitter, a transceiver, a modem, a network interface card, and/or an antenna.

Device 600 may perform one or more operations or processes described herein. For example, a non-transitory computer-readable medium (e.g., memory 630) may store a set of instructions (e.g., one or more instructions or code) for execution by processor 620. Processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, processor 620 may be configured to perform one or more operations or processes described herein. Thus, implementations described herein are not limited to any specific combination of hardware circuitry and software.

The number and arrangement of components shown in FIG. 6 are provided as an example. Device 600 may include additional components, fewer components, different components, or differently arranged components than those shown in FIG. 6. Additionally, or alternatively, a set of components (e.g., one or more components) of device 600 may perform one or more functions described as being performed by another set of components of device 600.

FIG. 7 is a flowchart of an example process 700 associated with interaction-based authentication and user interface adjustment. In some implementations, one or more process blocks of FIG. 7 may be performed by the remote server 530. In some implementations, one or more process blocks of FIG. 7 may be performed by another device or a group of devices separate from or including the remote server 530, such as a fingerprint application (e.g., fingerprint application 540), an operating system (e.g., operating system 510), and/or a mobile application (e.g., mobile application 520). Additionally, or alternatively, one or more process blocks of FIG. 7 may be performed by one or more components of the device 600, such as processor 620, memory 630, input component 640, output component 650, and/or communication component 660.

As shown in FIG. 7, process 700 may include transmitting, to a user device, instructions for generating a user interface including a first set of visual components (block 710). For example, the remote server 530 (e.g., using processor 620, memory 630, and/or communication component 660) may transmit, to a user device, instructions for generating a user interface including a first set of visual components, as described above in connection with reference number 110 of FIG. 1A and reference number 310 of FIG. 3A.

As further shown in FIG. 7, process 700 may include detecting, during a first interval, one or more first interactions with the user interface (block 720). For example, the remote server 530 (e.g., using processor 620 and/or memory 630) may detect, during a first interval, one or more first interactions with the user interface, as described above in connection with FIG. 1B and FIG. 3B. As an example, the first interaction(s) may include typing, clicking or tapping, and/or scrolling.

As further shown in FIG. 7, process 700 may include calculating a similarity score associated with a user based on first properties associated with the one or more first interactions and a fingerprint associated with the user (block 730). For example, the remote server 530 (e.g., using processor 620 and/or memory 630) may calculate a similarity score associated with a user based on first properties associated with the one or more first interactions and a fingerprint associated with the user, as described above in connection with reference number 125 of FIG. 1B and reference number 325 of FIG. 3B. As an example, the fingerprint may comprise a data structure that stores expected properties associated with the user. Accordingly, the remote server may determine a plurality of values associated with a plurality of dimensions in order to generate a vector based on the first properties, each dimension being associated with a corresponding type of interaction (e.g., a dimension associated with typing that includes values for properties associated with typing, and so on). Therefore, the remote server may compare the fingerprint to the vector in order to generate the similarity score.

As further shown in FIG. 7, process 700 may include adding a second set of visual components to the user interface based on the similarity score satisfying a first similarity threshold (block 740). For example, the remote server 530 (e.g., using processor 620 and/or memory 630) may add a second set of visual components to the user interface based on the similarity score satisfying a first similarity threshold, as described above in connection with reference number 130 of FIG. 1C. As an example, the remote server may transmit instructions for updating the user interface accordingly.

As further shown in FIG. 7, process 700 may include detecting, during a second interval, one or more second interactions with the user interface (block 750). For example, the remote server 530 (e.g., using processor 620 and/or memory 630) may detect, during a second interval, one or more second interactions with the user interface, as described above in connection with FIG. 1D and FIG. 3D. As an example, the second interaction(s) may include typing, clicking or tapping, and/or scrolling.

As further shown in FIG. 7, process 700 may include updating the similarity score associated with the user based on second properties associated with the one or more second interactions and the fingerprint associated with the user (block 760). For example, the remote server 530 (e.g., using processor 620 and/or memory 630) may update the similarity score associated with the user based on second properties associated with the one or more second interactions and the fingerprint associated with the user, as described above in connection with reference number 145 of FIG. 1D and reference number 345 of FIG. 3D. As an example, the remote server may determine a plurality of values associated with a plurality of dimensions in order to generate an updated vector based on the second properties, each dimension being associated with a corresponding type of interaction (e.g., a dimension associated with typing that includes values for properties associated with typing, and so on). Therefore, the remote server may compare the fingerprint to the updated vector in order to update the similarity score.

As further shown in FIG. 7, process 700 may include removing the second set of visual components from the user interface based on the updated similarity score failing to satisfy the first similarity threshold (block 770). For example, the mobile application 520 (e.g., using processor 620 and/or memory 630) may remove the second set of visual components from the user interface based on the updated similarity score failing to satisfy the first similarity threshold, as described above in connection with reference number 330 of FIG. 3C. As an example, the remote server may transmit instructions for updating the user interface accordingly.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel. The process 700 is an example of one process that may be performed by one or more devices described herein. These one or more devices may perform one or more other processes based on operations described herein, such as the operations described in connection with FIGS. 1A-1E and/or FIGS. 3A-3F. Moreover, while the process 700 has been described in relation to the devices and components of the preceding figures, the process 700 can be performed using alternative, additional, or fewer devices and/or components. Thus, the process 700 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

one or more memories; and one or more processors, coupled to the one or more memories, configured to:

transmit, to a device, instructions for generating a user interface, for output by an output component of the device, including a plurality of graphical user interface (GUI) components;

detect, during a first interval, a lack of interaction with the user interface from an input component of the device;

remove at least one GUI component, of the plurality of GUI components, from the user interface, based on the lack of interaction;

detect, during a second interval, one or more interactions with the user interface from the input component of the device;

calculate a similarity score associated with a user of the device based on properties associated with the one or more interactions and biometric data associated with the user; and modify the user interface that is output by the output component of the device based on a comparison of the similarity score with a similarity threshold.

2. The system of claim 1, wherein transmission of the instructions for generating the user interface is based on one or more credentials associated with a user of the device.

3. The system of claim 1, wherein the one or more processors are further configured to:

prompt the device for one or more credentials associated with a user of the device based on detecting the lack of interaction.

4. The system of claim 1, wherein, to modify the user interface, the one or more processors are configured to:

restore the at least one GUI component to the user interface based on the similarity score satisfying the similarity threshold.

5. The system of claim 1, wherein, to modify the user interface, the one or more processors are configured to:

remove at least one other GUI component from the user interface based on the similarity score failing to satisfy the similarity threshold.

6. The system of claim 1, wherein the one or more processors, to remove the at least one GUI component, are configured to:

remove the at least one GUI component based on the first interval satisfying a time threshold.

7. A method comprising:

transmitting, to a device, instructions for generating a user interface, for output by an output component of the device, including a first set of graphical user interface (GUI) components;

detecting, during a first interval, one or more first interactions with the user interface from an input component of the device;

modifying the first set of GUI components based on first properties associated with the one or more first interactions;

detecting, during a second interval, one or more second interactions with the user interface from the input component of the device;

calculating a similarity score associated with a user of the device based on second properties associated with the one or more second interactions; and modifying the user interface based on a comparison of the similarity score with a similarity threshold.

8. The method of claim 7, wherein calculating the similarity score is based on biometric data associated with the user.

9. The method of claim 7, further comprising:

detecting, during a third interval, one or more third interactions with the user interface from the input component of the device; and updating the similarity score based on third properties associated with the one or more third interactions.

10. The method of claim 7, wherein modifying the user interface comprises:

adding a second set of GUI components to the user interface based on the second properties associated with the one or more second interactions.

11. The method of claim 7, wherein modifying the user interface comprises:

removing a second set of GUI components from the user interface based on the second properties associated with the one or more second interactions.

12. The method of claim 7, wherein modifying the user interface comprises:

removing the second set of GUI components from the user interface based on an updated similarity score failing to satisfy the similarity threshold.

13. The method of claim 7, wherein transmitting the instructions for generating the user interface is based on one or more credentials associated with the user.

14. A non-transitory computer-readable medium storing a set of instructions, the set of instructions comprising:

one or more instructions that, when executed by one or more processors of a device, cause the device to:

transmit, to another device, instructions for generating a user interface, for output by an output component of the other device, including a first set of graphical user interface (GUI) components;

detect, during a first interval, one or more first interactions with the user interface from an input component of the other device;

modify the first set of GUI components based on first properties associated with the one or more first interactions;

detect, during a second interval, one or more second interactions with the user interface from the input component of the device;

calculate a similarity score associated with a user based on second properties associated with the one or more second interactions; and modify the user interface based on a comparison of the similarity score with a similarity threshold.

15. The non-transitory computer-readable medium of claim 14, wherein the one or more instructions, when executed by the one or more processors, further cause the device to:

detect one or more third interactions with the user interface;

update the similarity score based on the one or more third interactions; and remove the second set of visual components from the user interface based on the updated similarity score.

16. The non-transitory computer-readable medium of claim 14, wherein the one or more instructions, when executed by the one or more processors, further cause the device to:

obscure information, included in the user interface, that is associated with a sensitivity level satisfying a sensitivity threshold.

17. The non-transitory computer-readable medium of claim 14, wherein the second set of visual components comprise:

a menu associated with one or more functions;

a button associated with a function; or text information classified as sensitive.

18. The non-transitory computer-readable medium of claim 14, wherein the one or more instructions, when executed by the one or more processors to calculate the similarity score, cause the device to:

determine a plurality of values associated with a corresponding type of interaction.

19. The non-transitory computer-readable medium of claim 14, wherein the one or more instructions, when executed by the one or more processors, further cause the device to:

determine whether the similarity score satisfies the similarity threshold based on a hysteresis value.

* * * * *